United States Patent
Mizude et al.

(10) Patent No.: US 10,447,882 B2
(45) Date of Patent: Oct. 15, 2019

(54) IMAGE READING APPARATUS AND IMAGE READING METHOD

(71) Applicant: SHARP KABUSHIKI KAISHA, Sakai, Osaka (JP)

(72) Inventors: Kazuhiro Mizude, Sakai (JP); Kazuma Ogawa, Sakai (JP); Tatsuya Fujisaki, Sakai (JP); Sho Tsujimoto, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/889,467

(22) Filed: Feb. 6, 2018

(65) Prior Publication Data

US 2018/0234577 A1 Aug. 16, 2018

(30) Foreign Application Priority Data

Feb. 15, 2017 (JP) ................................. 2017-026024

(51) Int. Cl.
*H04N 1/00* (2006.01)
*H04N 1/10* (2006.01)

(52) U.S. Cl.
CPC ....... *H04N 1/10* (2013.01); *H04N 2201/0458* (2013.01)

(58) Field of Classification Search
None
See application file for complete search history.

(56) References Cited

U.S. PATENT DOCUMENTS

| 2003/0039394 A1* | 2/2003 | Yamazaki | G06K 9/325 382/176 |
| 2005/0140991 A1* | 6/2005 | Ogiwara | H04N 1/3873 358/1.2 |
| 2009/0219558 A1 | 9/2009 | Murakami | |
| 2017/0244853 A1* | 8/2017 | Yabuuchi | H04N 1/00827 |

FOREIGN PATENT DOCUMENTS

| JP | 2003-219085 A | 7/2003 |
| JP | 2003-338920 A | 11/2003 |
| JP | 2007-013378 A | 1/2007 |
| JP | 2007-020122 A | 1/2007 |

* cited by examiner

*Primary Examiner* — Frantz Bataille
(74) *Attorney, Agent, or Firm* — ScienBiziP, P.C.

(57) ABSTRACT

An image reading apparatus includes a platen on which a document is to be placed; an image generating unit that performs scanning on the platen to generate a position detection image and an output image; a document position detecting unit that detects whether a document exists and a position of the document based on the generated position detection image; a document extracting unit that extract an area corresponding to the document from the generated output image; and a control unit that controls the image generating unit, the document position detecting unit, and the document extracting unit so as to output an image of the extracted document.

6 Claims, 19 Drawing Sheets

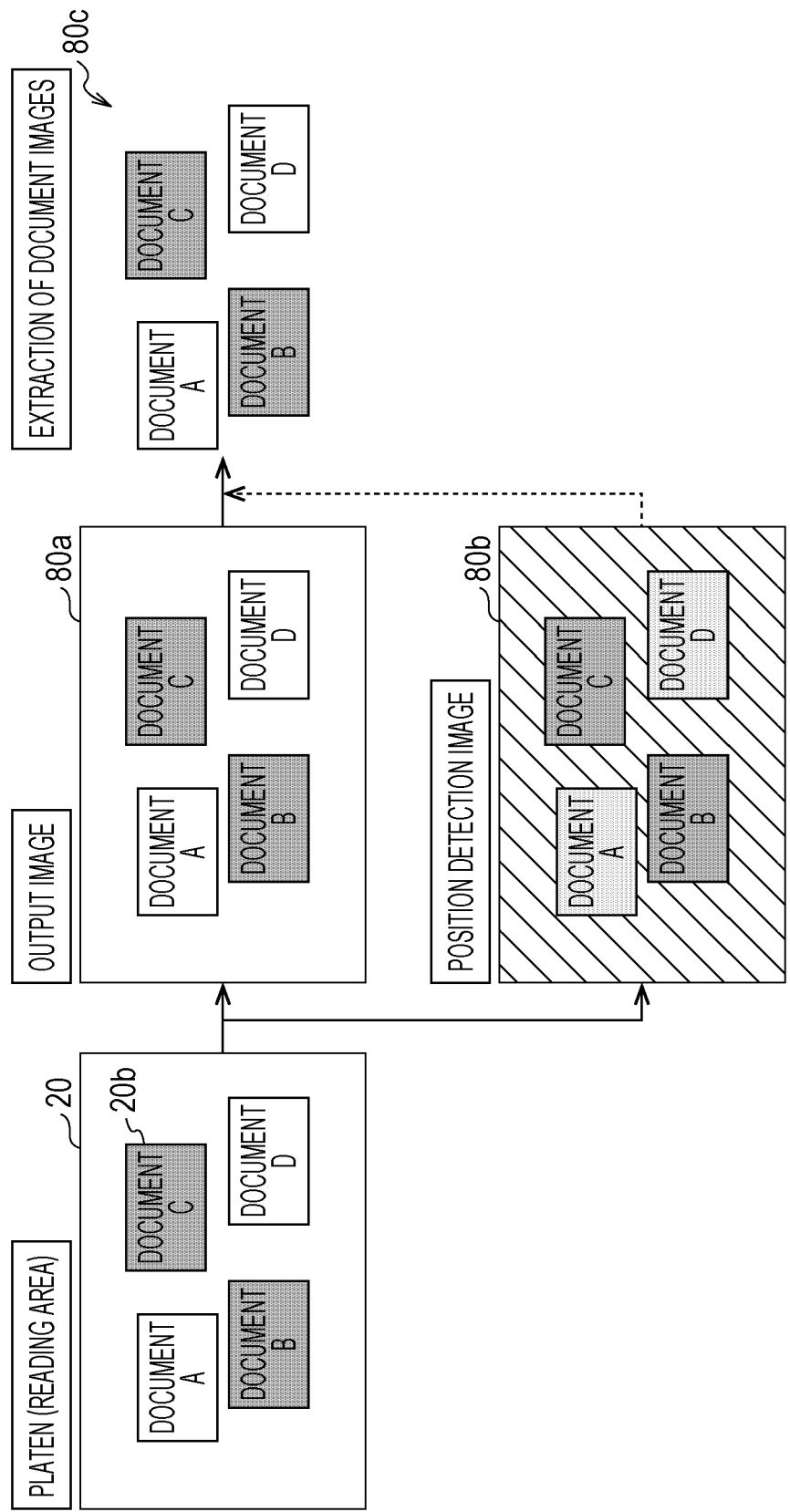

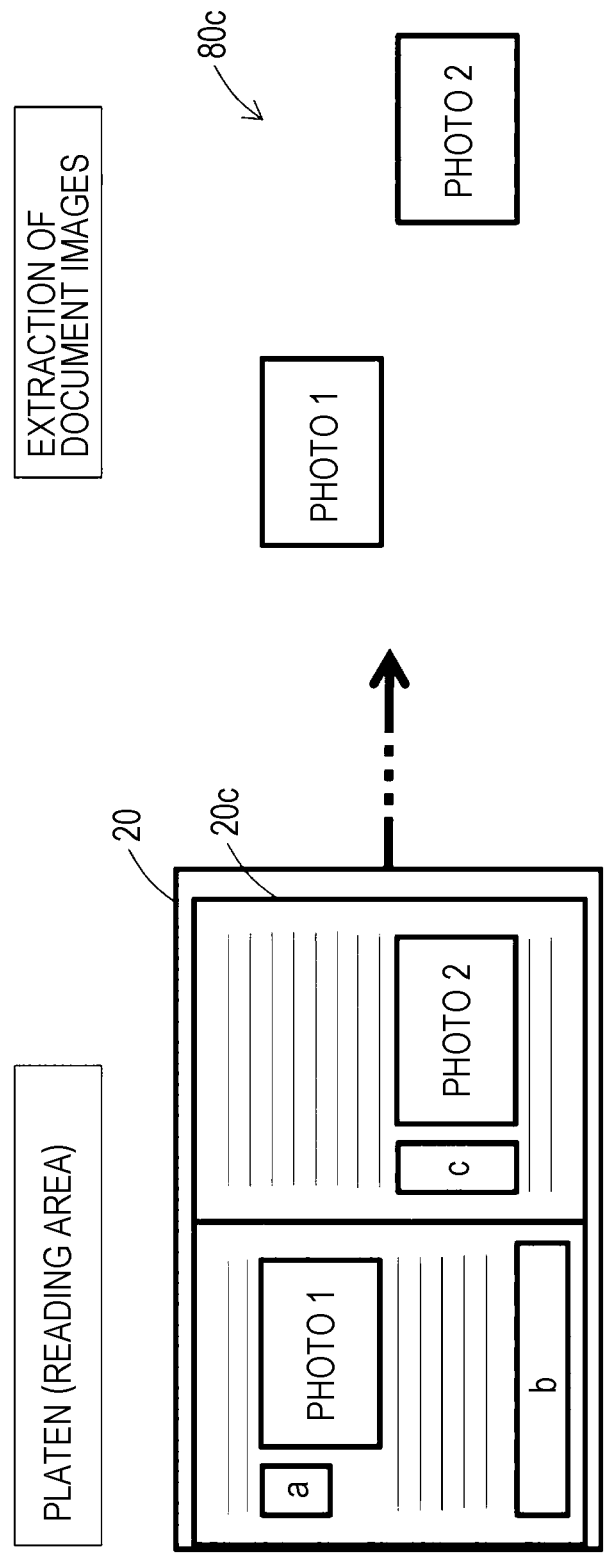

IMAGE READING APPARATUS AND IMAGE READING METHOD

BACKGROUND

1. Field

The present disclosure relates to image reading apparatuses and image reading methods. In particular, the present disclosure relates to an image reading apparatus having a multi-crop function and an image reading method suitable for the multi-crop function.

2. Description of the Related Art

In reading of small size documents, such as name cards, postcards, or photos, a multi-crop scanning function and image reading apparatuses having the multi-crop scanning function are known. The multi-crop scanning function is used to scan and collectively read multiple documents in a state in which the documents are placed alongside each other on a platen and cut out an image corresponding to each document.

For example, apparatuses are proposed which detect the numbers of documents and the positions of the documents in pre-scanning, scan the documents one by one, and indicate how many documents have been scanned in order to indicate the image reading state to users, (for example, refer to Japanese Unexamined Patent Application Publication No. 2003-219085). In addition, apparatuses are proposed which, even when documents of different sizes or kinds are mixed, control the cut-out order of images depending on the document sizes of the images that are cut out, the positions of the documents, the sizes of recording sheets of paper used to record the documents, and the kinds of the recording sheets of paper (for example, refer to Japanese Unexamined Patent Application Publication No. 2007-013378). Furthermore, apparatuses are proposed which compare the number of documents that are input with the number of documents that are detected and display the results of the comparison in order to accurately detect and read the number of images to be cropped which the users desire (for example, refer to Japanese Unexamined Patent Application Publication No. 2007-020122).

In one useful method to cut out an image corresponding to each document, the boundary between each document and an area outside the document is extracted based on the assumption that the document has a substantially rectangular shape and the margin of the document is white or a color of a low density. In order to accurately read the boundary, the reading is performed with a document cover being opened so as to read the area outside the document in black or a color of a high density.

For example, an image reading apparatus is considered in which the document face is irradiated with light from the lower side to read reflected light irregularly reflected from the document face. In reading of a document, scanning is performed with the document being pressed from the upper side using a document cover the bottom face of which is usually white. The reason why the bottom face of the document cover is white will now be described. In reading of a general document, such as a business document or a booklet, which is not a target of the multi-crop scanning, the document size may be often smaller than the area where images are scanned. In such a case, since the white color of the document cover is read in the scanning area outside the document, that is, an area where the document does not exist, the user feels no feeling of strangeness between the scanning area outside the document and the ground color, that is, the background color of the document.

In contrast, in the case of the multi-crop scanning, the user is prompted to perform the scanning with the document cover being opened. When the scanning is performed with the document cover being opened, the area outside the document is read in black because no irregular reflection of light that is emitted occurs. Accordingly, since the difference in density occurs between the image read in the margin of the white document or the document having a low density and the image read in the area outside the document, the boundary of the document is capable of being determined based on the density.

Since characters, graphics, images, or etc. are drawn on a white sheet in the case of a general business document or the like, the margin of the document is blank and has a ground color of white. However, the same does not apply to a document to be subjected to the multi-crop scanning.

For example, there are two kinds of photo documents, which are considered to be targets of the multi-crop scanning: photo documents with no margin and photo documents with white margins. In the case of the photo documents with no margin, when all or part of the margins of the photo documents has low densities and has colors close to white, it is difficult to determine the boundary with the white bottom face of the document cover in the scanning with the document cover being closed. In contrast, in the case of the photo document with no margin, when all or part of the margins of the photo documents has high densities and has colors close to black, it is difficult to determine the boundary with the area outside the document in the scanning with the document cover being opened. The boundary between the document and the area outside the document is made unclear in both cases and the cutting-out of the images may not be well done.

A case will be considered in which the targets of the multi-crop scanning are name cards. Since the ground colors of many name cards are white or light colors, the boundaries with the areas outside the documents are made clear and the name cards are easily detected in the case in which the reading is performed with the document cover being opened. However, when black areas exist in the margins of the name cards, it is difficult to determine the boundaries with the name cards. In addition, there are name cards the ground colors of which are black or have high densities and which include voided characters. When the name cards the margins or the entire ground colors of which are black or have high densities are scanned with the document cover being opened, the boundary with the areas outside the documents are not capable being determined and the cutting-out of the name card images may not be accurately performed. However, requiring the users to perform a complicated process of selecting only the name cards having high-density ground colors to scan such name cards separately from the name cards having white ground colors reduces the value of the multi-crop scanning, which is a useful function.

SUMMARY

It is desirable to provide an image reading apparatus capable of appropriately extracting an image of a document regardless of whether the margin of the document has a low density or a high density.

In order to resolve the above problems, as a result of close examination, the inventors acquire the idea that, in addition to images that are to be cut out and output as document images, images to identify and cut out the positions of the documents are prepared from the images that are subjected to batch scanning to make their disclosure. Specifically, the documents are extracted from images that are subjected to the batch scanning using image data in which the boundary between the document and the area outside the document is easily determined. Since it is difficult to determine the boundary with the area outside the document both when the image of the document is close to white and when the image of the document is close to black, an image of an intermediate density is generated to determine the position of the document.

According to an aspect of the disclosure, there is provided an image reading apparatus including a platen on which a document is to be placed, an image generating unit that performs scanning on the platen to generate a position detection image and an output image, a document position detecting unit that detects whether a document exists and a position of the document based on the generated position detection image, a document extracting unit that extract an area corresponding to the document from the generated output image, and a control unit that controls the image generating unit, the document position detecting unit, and the document extracting unit so as to output an image of the extracted document.

According to another aspect of the disclosure, there is provided an image reading apparatus including a platen on which a document is to be placed, an image generating unit that performs scanning on the platen to generate a position detection image, a document position detecting unit that detects whether a document exists and a position of the document based on the generated position detection image, an image converting unit that extracts an area corresponding to the position from the generated position detection image to convert the area into an image to be output, and a control unit that controls the image generating unit, the document position detecting unit, and the image converting unit so as to output the converted image.

According to another aspect of the disclosure, there is provided an image reading method causing a computer to perform generating a position detection image and an output image by performing scanning on a platen on which a document is placed, detecting whether a document exists and a position of the document based on the generated position detection image, extracting an area corresponding to the document from the generated output image, and outputting an image of the extracted document.

According to another aspect of the disclosure, there is provided an image reading method causing a computer to perform generating a position detection image by performing scanning on a platen on which a document is placed, detecting whether a document exists and a position of the document based on the generated position detection image, extracting an area corresponding to the position from the generated position detection image to convert the area into an image to be output, and outputting the converted image.

BRIEF DESCRIPTION OF THE DRAWINGS

FIG. 6A is a first explanatory diagram illustrating an exemplary operational process of the digital multifunction peripheral illustrated in FIG. 1 in multi-crop scanning;

FIG. 6B is a second explanatory diagram illustrating the exemplary operational process of the digital multifunction peripheral illustrated in FIG. 1 in the multi-crop scanning;

FIG. 6C is a third explanatory diagram illustrating the exemplary operational process of the digital multifunction peripheral illustrated in FIG. 1 in the multi-crop scanning;

FIG. 7 is an explanatory diagram illustrating an exemplary flow of a process of cutting out an image of one or more documents from images that are read through batch scanning in the first embodiment;

FIG. 17 is an explanatory diagram illustrating an example in which a two-page document of a newspaper or a booklet, which is placed on the platen, is subjected to the multi-crop scanning to extract photos in a fifth embodiment.

DESCRIPTION OF THE EMBODIMENTS

Embodiments of the present disclosure will herein be described in detail with reference to the drawings. The embodiments described below are only examples and are not intended to limit the present disclosure.

First Embodiment

Outline of Image Reading Apparatus

A specific example of an image reading apparatus according to a first embodiment will now be described.

Figure 1:
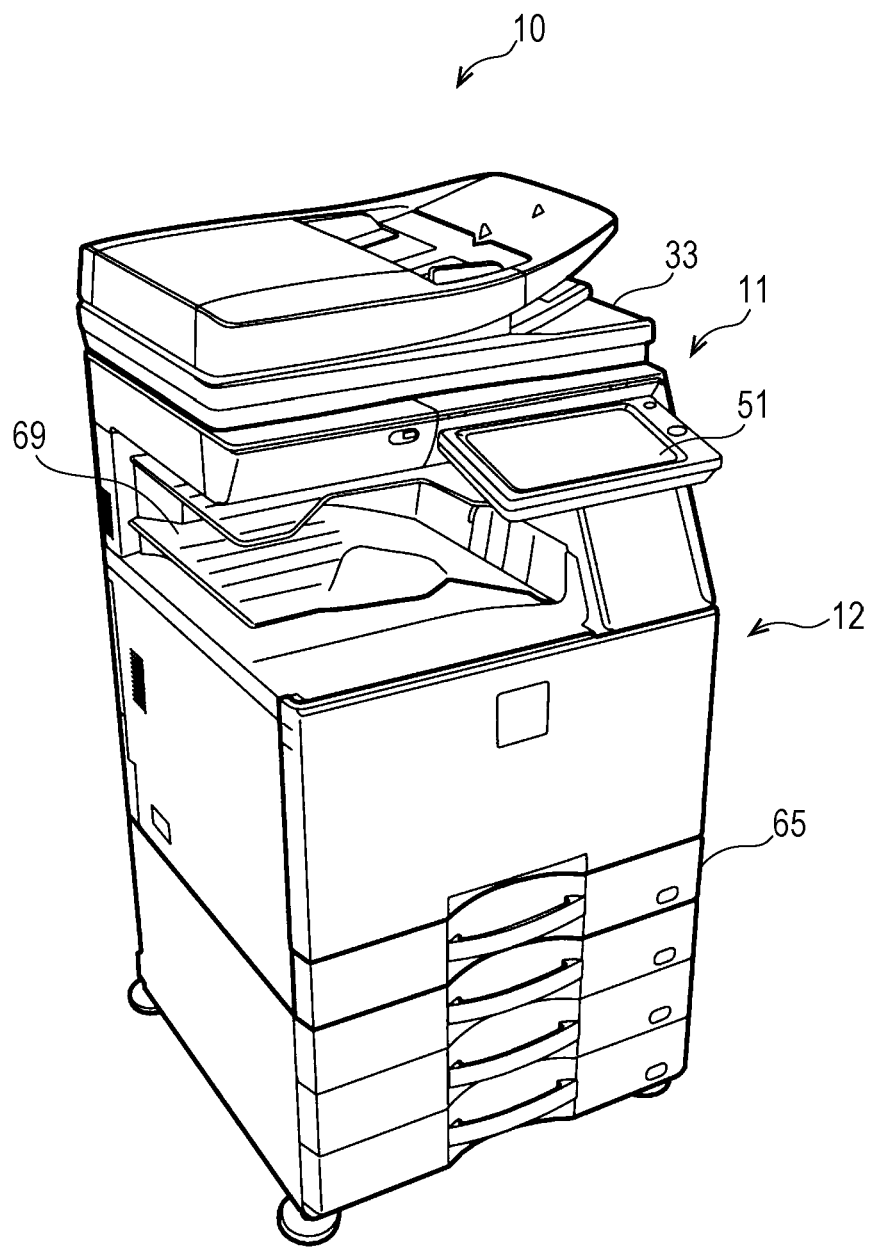
FIG. 1 is an external perspective view of a digital multifunction peripheral, which is illustrated as an example of an image reading apparatus according to a first embodiment.
Figure 2:
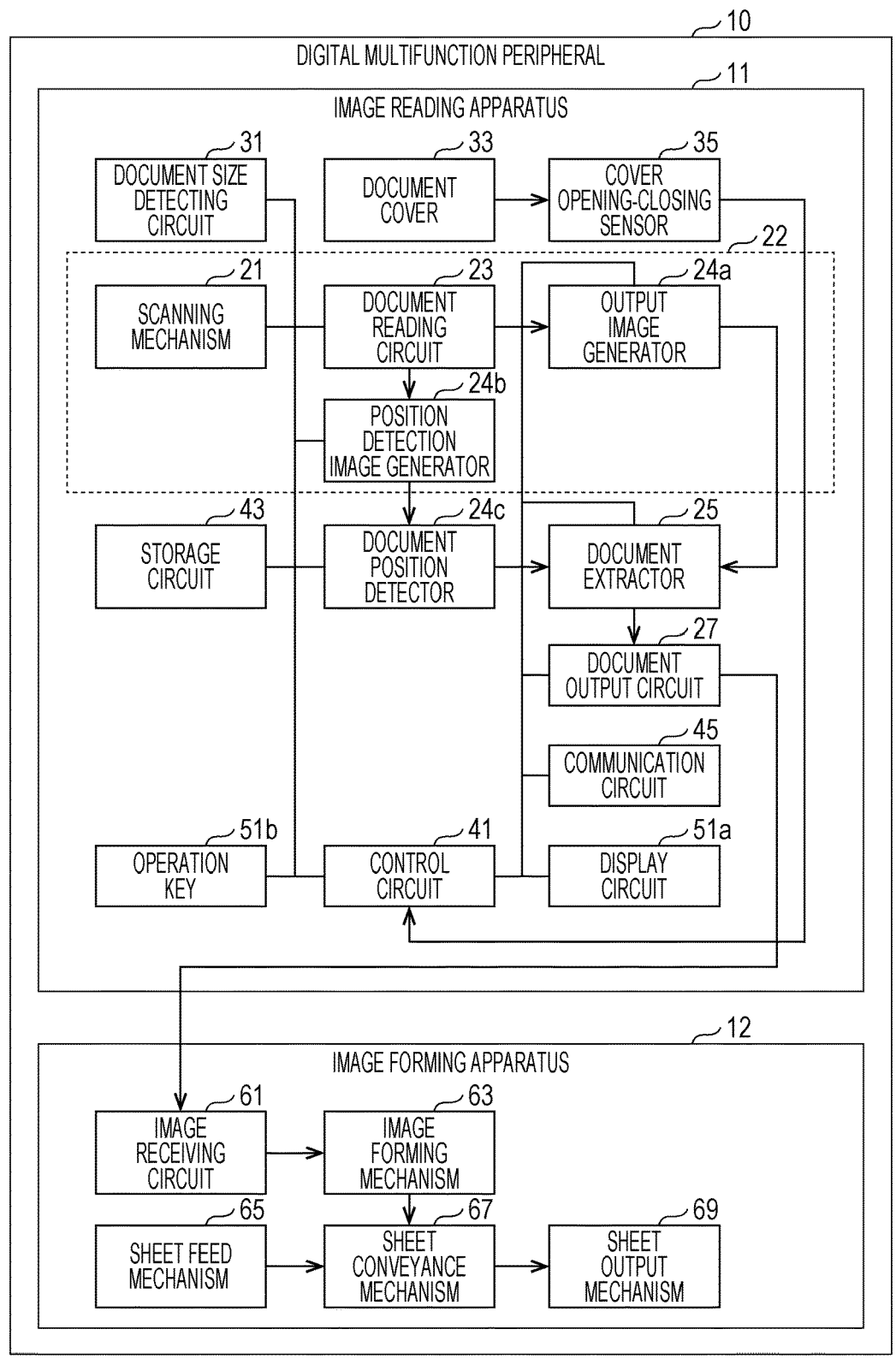
FIG. 2 is a block diagram illustrating an exemplary configuration of the digital multifunction peripheral illustrated in FIG. 1.

FIG. 1 is an external perspective view of a digital multifunction peripheral, which is illustrated as an example of the image reading apparatus according to the first embodiment. FIG. 2 is a block diagram illustrating an exemplary configuration of the digital multifunction peripheral illustrated in FIG. 1.

Referring to FIG. 1 and FIG. 2, a digital multifunction peripheral 10 includes an image reading apparatus 11 according to the first embodiment and an image forming apparatus 12 that performs printing. The digital multifunction peripheral 10 is capable of being connected to a network (not illustrated) via a communication circuit 45. The digital multifunction peripheral 10 is capable of transmitting image data for a document that is read with the image reading apparatus 11 to an external device over the network. In addition, the digital multifunction peripheral 10 is capable of receiving print data from an external device over the network and printing the received print data with the image forming apparatus 12. The digital multifunction peripheral 10 has the functions of a copier, a printer, a scanner, an image filer, and a facsimile.

A document cover 33 illustrated in FIG. 1 also serves as an automatic document feeder. A user is capable of opening the document cover 33 upward with his/her hand. Although the document cover 33 is used in a closed state when the document cover 33 is used as the automatic document feeder, a platen 20 (not illustrated in FIG. 1) (refer to FIG. 3 described below) is provided under the document cover 33 when the document cover 33 is opened upward. A document placed on the platen 20 by the user is capable of being read. A cover opening-closing sensor 35 (refer to FIG. 2) detects whether the document cover is opened or closed.

The platen 20 is made of transparent glass. A scanning mechanism 21 that scans a document while moving and a document reading circuit 23 that reads an image of the document scanned by the scanning mechanism 21 are arranged below the platen 20. In the first embodiment, the document reading circuit is a line-shaped image sensor.

In addition, the image reading apparatus 11 includes an image processing circuit. The image processing circuit includes a position detection image generator 24b that generates an image for position detection (hereinafter referred to as a position detection image) from a reading area that is scanned by the scanning mechanism 21 and is read by the document reading circuit 23 and an output image generator 24a that generates an image for output (hereinafter referred to as an output image). The functions of the position detection image generator 24b and the output image generator 24a are realized by software processing in which hardware resources of a storage circuit 43 and the image processing circuit are controlled by a control circuit 41, that is, through cooperation of the hardware and the software.

The scanning mechanism 21, the document reading circuit 23, the position detection image generator 24b, and the output image generator 24a compose an image generating unit 22.

A document position detector 24c determines whether a document exists on the platen based on the generated position detection image and, if a document exists on the platen, determines the position of the document.

A document extractor 25 cuts out an area corresponding to the position of the document, which is determined by the document position detector 24c, from the generated output image. An image output circuit 27 outputs the image that is cut out.

The functions of the document position detector 24c and the document extractor 25 are realized by the hardware processing by the image processing circuit, the software processing, or a combination of the hardware processing and the software processing.

Furthermore, the image reading apparatus 11 includes the image output circuit 27. The image output circuit 27 gives a file name to image data that is read and stores the image data to which the file name is given in the storage circuit 43, which is a memory, or a universal serial bus (USB) memory connected to a USB connector 71 described below (refer to FIG. 3 described below). Alternatively, the image output circuit 27 may transmit the image data to the image forming apparatus 12 or to an external device over the network via the communication circuit 45. The communication circuit 45 is capable of communication over a public telephone line, in addition to a local area network (LAN) and a wide area network (WAN). Transmission and reception of image data over the public telephone line corresponds to the facsimile function.

A document size detecting circuit 31 detects the size of a document placed on the platen and documents set in the automatic document feeder. However, the document sizes which the document size detecting circuit 31 is capable of detecting are limited to sizes of predetermined kinds (fixed sizes).

As illustrated in FIG. 1, an operation display circuit 51 including a liquid crystal display panel and a touch panel is disposed on the front side of the platen. Referring to FIG. 2, the liquid crystal display panel corresponds to a display circuit 51a. The touch panel covering the display face of the liquid crystal display panel corresponds to an operation key 51b.

The control circuit 41 performs control of components including detection of a document size by the document size detecting circuit 31, scanning of a document by the scanning mechanism 21, reading of an image by the document reading circuit 23, display on the display circuit 51a, and reception of an operation with the operation key 51b. The control circuit 41 corresponds to a control unit of the present disclosure.

The image forming apparatus 12 includes an image receiving circuit 61 that receives an image read by the image reading apparatus 11 or image data transmitted from a device other than the image reading apparatus 11. In addition, the image forming apparatus 12 includes an image forming mechanism 63 that generates a visible image based on the acquired image data. The image forming mechanism 63 forms an image using a known method, such as an electrophotographic method or an ink-jet method. A sheet feed mechanism 65 feeds a print sheet to the image forming mechanism 63. A sheet conveyance mechanism 67 conveys the print sheet fed from the sheet feed mechanism 65 to the image forming mechanism 63. The image forming mechanism 63 transfers the formed image on the print sheet that is conveyed and fixes the image on the print sheet to supply the print sheet to a sheet output mechanism 69.

Although the operation of the image forming apparatus may be controlled by a dedicated control circuit not illustrated in FIG. 2, the operation of the image forming apparatus is controlled by the control circuit 41 in the first embodiment.

Detection of Platen and Document Size

The platen and detection of the size of a document placed on the platen in the first embodiment will now be described.

Figure 3:
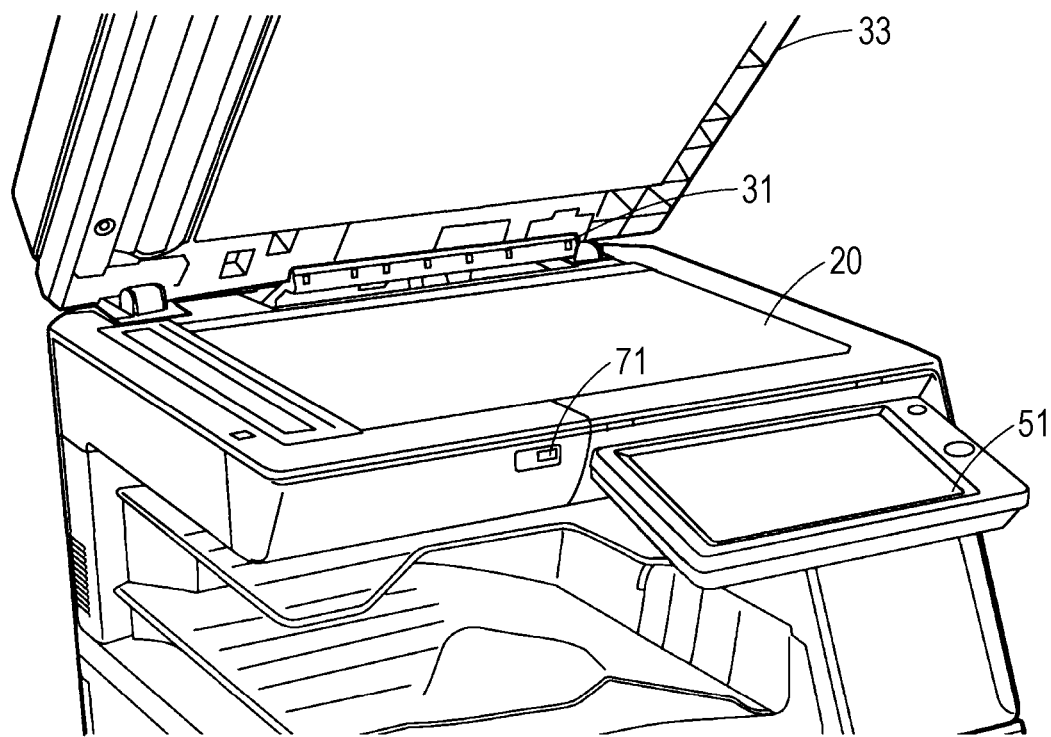
FIG. 3 is a perspective view illustrating an external view of a platen and around the platen in the digital multifunction peripheral illustrated in FIG. 1.

FIG. 3 is a perspective view illustrating an external view of the platen and around the platen in the digital multifunction peripheral illustrated in FIG. 1. The document cover 33 is opened upward and the platen 20 is disposed under the document cover 33 in FIG. 3. The document size detecting circuit 31 is disposed at the back of the platen 20. Although the document size detecting circuit 31 is above the platen 20 in the state in which the document cover 33 is opened, that is, when the cover opening-closing sensor 35 detects the opening state, the document size detecting circuit 31 is pressed down by the document cover 33 to be moved downward when the document cover 33 is closed.

A light emitting portion of the document size detecting circuit 31 is illustrated in FIG. 3 and multiple light emitting devices are arranged in the light emitting portion. A light receiving portion of the document size detecting circuit 31 is provided in a portion (not illustrated) below the platen 20 and multiple photo detectors paired with the respective light emitting devices are arranged in the light receiving portion. In the state in which the document cover 33 is opened, light rays emitted from each light emitting device reach the paired photo detector and the control circuit 41 recognizes that the photo detector has detected the light rays. When a document is placed on the platen 20, the light rays from each light emitting device is blocked by the document and do not reach the paired photo detector. Since the pair of the light emitting device and the photo detector from which the light rays are blocked and the pair of the light emitting device and the photo detector which the light rays reach are varied depending on the size of the document that is placed on the platen 20, the control circuit 41 detects the size of the document based on which pair of the light emitting device and the photo detector the light rays reach.

The operation display circuit 51 and the USB connector 71 are disposed on the front side of the platen 20. The USB connector 71 is used to connect a USB device, such as a USB memory, to the digital multifunction peripheral 10. The digital multifunction peripheral 10 has a function to read a document placed on the platen 20 in a state in which the USB memory is connected to the USB connector 71 and store image data for the read document in the USB memory.

Operational Process of Multi-Crop Scanning

An exemplary operational process of document reading (multi-crop scanning) using the multi-crop function of the present disclosure will now be described.

FIG. 4, FIG. 5, and FIGS. 6A to 6O are explanatory diagrams illustrating an exemplary operation when the multi-crop scanning is performed using the digital multifunction peripheral 10.

Figure 4:
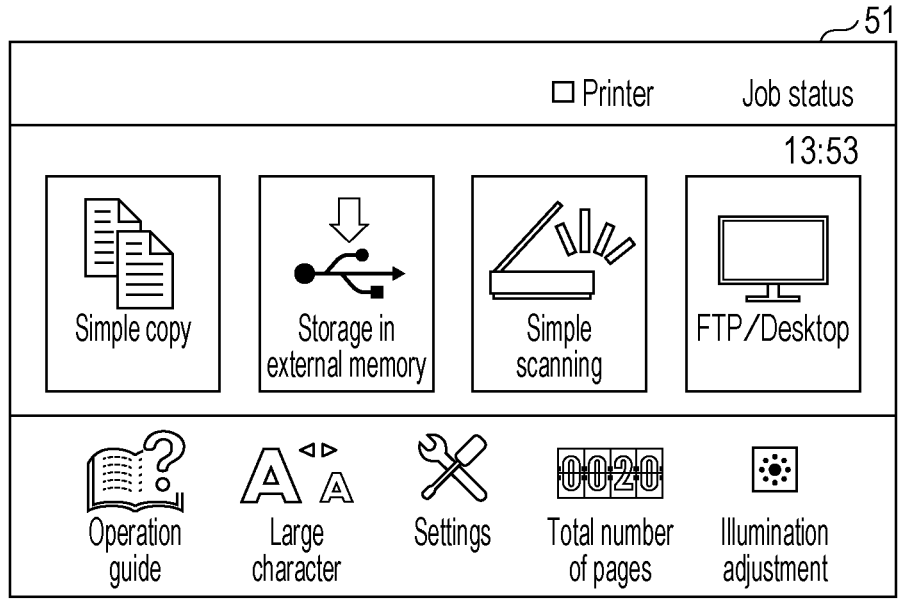
FIG. 4 is a first explanatory diagram illustrating an exemplary operational process of the digital multifunction peripheral illustrated in FIG. 1 in reading of a document.

FIG. 4 illustrates an example of an operation screen displayed in the operation display circuit 51 while the image reading apparatus 11 is waiting. Operation keys (operation buttons) associated with various functions of the digital multifunction peripheral 10 including the image reading apparatus 11 are displayed on the operation screen. The various functions are performed in response to touching of the operation keys by the user. The operational process of the multi-crop scanning (document reading) will be described, taking a case in which a document is read to store image data for the document in a USB memory connected to the USB connector 71, among the functions, as an example.

Figure 5:
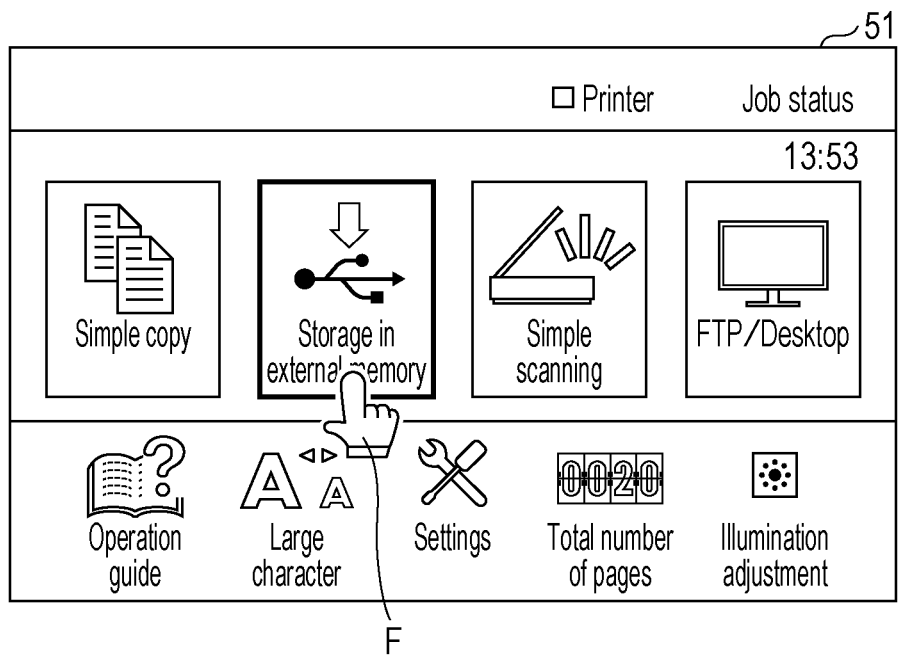
FIG. 5 is a second explanatory diagram illustrating the exemplary operational process of the digital multifunction peripheral illustrated in FIG. 1 in reading of a document.

The user touches an operation key "Storage in external memory" on the operation screen illustrated in FIG. 4 in order to read a document to store image data for the document in the USB memory (refer to FIG. 5). A hand and fingers illustration in FIG. 5 indicates an operation in which the user touches the operation key "Storage in external memory" with his/her finger F. An operation to touch an operation key by the user is indicated using a similar hand and fingers illustration in the following description.

In response to the operation illustrated in FIG. 5, the control circuit 41 causes the operation display circuit 51 to display an operation screen illustrated in FIG. 6A. Operation keys associated with setting of reading conditions including "File name", "Color mode", "Resolution", "Format", "Document", and "Density" are arranged on the operation screen in FIG. 6A. In addition, a "Reset" key used to reset the setting and a "Start" key to start reading are arranged on the operation screen in FIG. 6A.

"File name" is an operation key used by the user to specify a file name of the image data to be stored in the USB memory. "Color mode" is an operation key used to select a mode from color, grayscale, and monochrome. "Resolution" is an operation key to select a resolution in reading. "Format" is an operation key used to select a format, such as Portable Document Format (PDF), Tagged Image File Format (TIFF), or Joint Photographic Experts Group (JPEG), of the image data to be output. "Document" is an operation key used by the user to specify a document size or duplex printing. "Density" is an operation key used to select a density in reading of a document. The user uses these operation keys to set the reading conditions, if desired.

Upon touching of an "Other functions" key by the user on the operation screen in FIG. 6A (refer to FIG. 6B), the control circuit 41 causes the operation display circuit 51 to display an operation screen illustrated in FIG. 6C in response to this operation. A "Multi-crop" key is displayed on the operation screen in FIG. 6C as one of the other functions. Although a "Photo multi-crop" key is also related to the present disclosure, the photo multi-crop function will be described below and "Multi-crop" will be described first.

Upon pressing of the "Multi-crop" key by the user (refer to FIG. 6D), the control circuit 41 displays a check mark indicating that "Multi-crop" is selected on the "Multi-crop" key in response to this operation. Then, the control circuit 41 causes the operation display circuit 51 to display a message "Use document holder pressed." with an "OK" key (refer to FIG. 6E).

Upon reading of the message "Use document holder pressed." and pressing of the "OK" key by the user (refer to FIG. 6F), the control circuit 41 clears the message in response to this operation.

The user arranges multiple documents to be subjected to the multi-crop scanning on the platen 20 and closes the document cover 33. Upon pressing of the "Start" key by the user, the control circuit 41 starts batch scanning in the multi-crop.

Figure 6D:
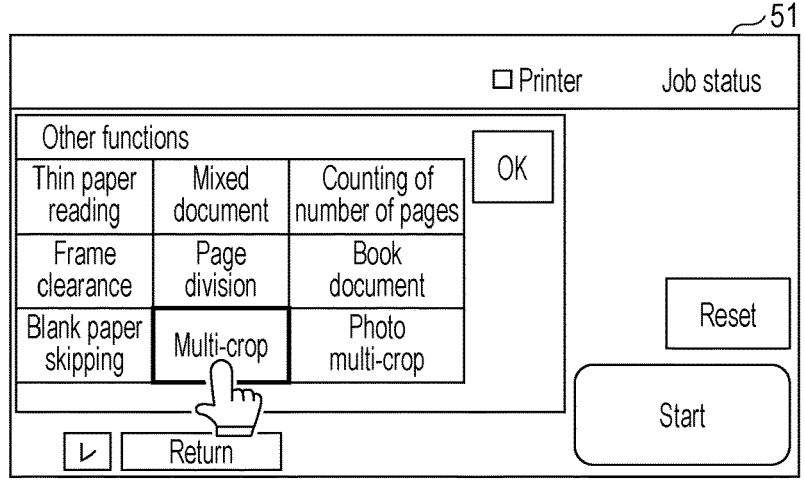
FIG. 6D is a fourth explanatory diagram illustrating the exemplary operational process of the digital multifunction peripheral illustrated in FIG. 1 in the multi-crop scanning.
Figure 6E:
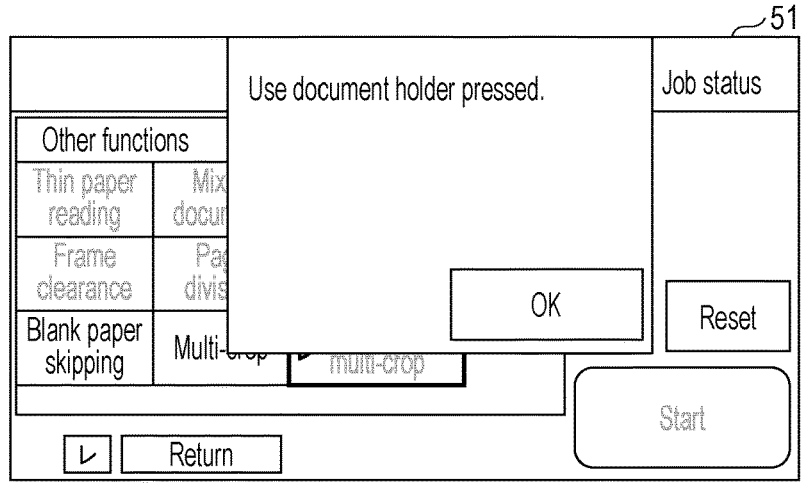
FIG. 6E is a fifth explanatory diagram illustrating the exemplary operational process of the digital multifunction peripheral illustrated in FIG. 1 in the multi-crop scanning.
Figure 6F:
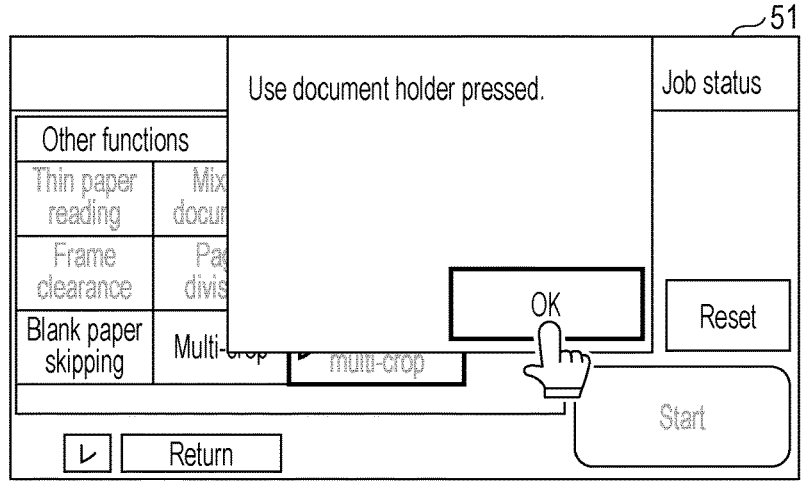
FIG. 6F is a sixth explanatory diagram illustrating the exemplary operational process of the digital multifunction peripheral illustrated in FIG. 1 in the multi-crop scanning.
Figure 6G:
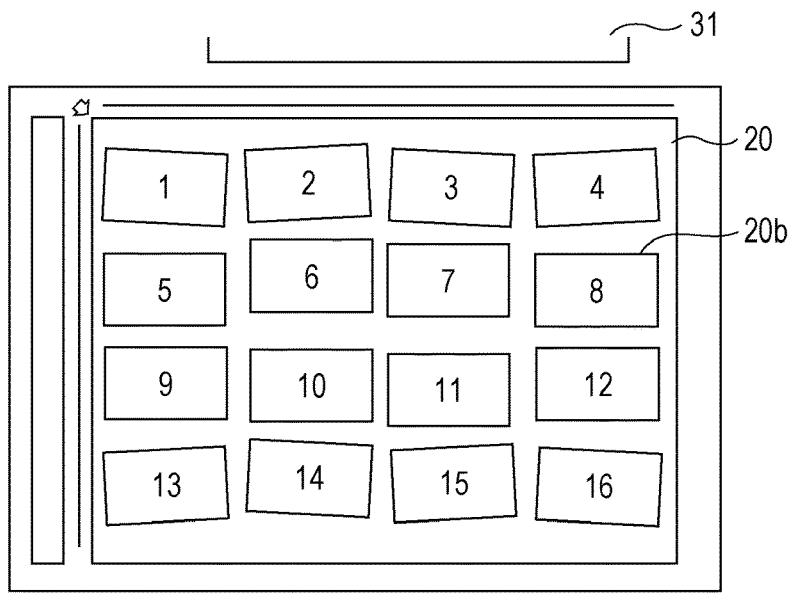
FIG. 6G is a seventh explanatory diagram illustrating the exemplary operational process of the digital multifunction peripheral illustrated in FIG. 1 in the multi-crop scanning.

FIG. 6G is an explanatory diagram illustrating a state in which 16 documents 20b for the multi-crop scanning are placed on the platen 20. Numbers 1 to 16 added to the respective documents indicate an example of the cut-out order and the numbers correspond to sequential numbers of the file names described below.

Figure 6H:
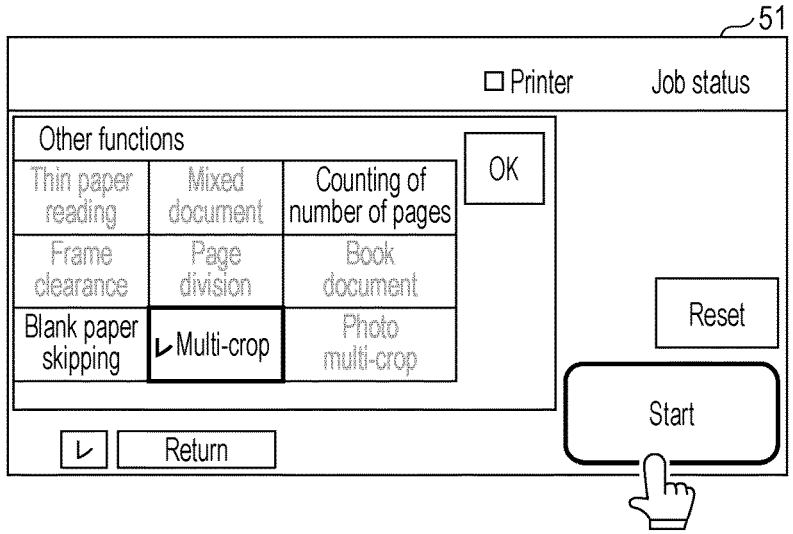
FIG. 6H is an eighth explanatory diagram illustrating the exemplary operational process of the digital multifunction peripheral illustrated in FIG. 1 in the multi-crop scanning.
Figure 6I:
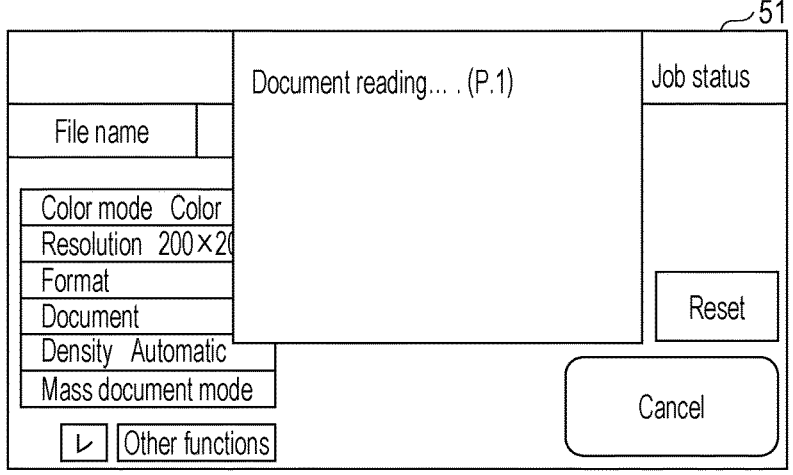
FIG. 6I is a ninth explanatory diagram illustrating the exemplary operational process of the digital multifunction peripheral illustrated in FIG. 1 in the multi-crop scanning.

Upon pressing of the "Start" key by the user in the state in which the document cover 33 is opened (refer to FIG. 6H), the control circuit 41 sets the reading area to a maximum area for the multi-crop scanning and causes the scanning mechanism 21 and the document reading circuit 23 to perform the batch scanning of the 16 documents 20b to read the documents 20b in response to this operation. In addition, the control circuit 41 causes the operation display circuit 51 to display a message "Document reading . . . . (P.1)" and a "Cancel" key during the reading, as illustrated in FIG. 6I. "(P.1)" in the message indicates that the first batch scanning is being performed.

Figure 6J:
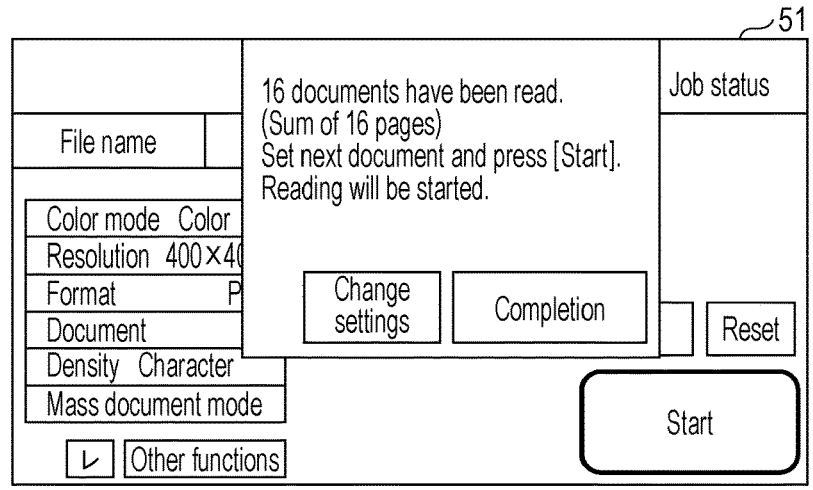
FIG. 6J is a tenth explanatory diagram illustrating the exemplary operational process of the digital multifunction peripheral illustrated in FIG. 1 in the multi-crop scanning.

Upon termination of the first batch scanning, the document extractor 25 cuts out images corresponding to the 1 to 16 documents. The control circuit 41 causes the operation display circuit 51 to display operation keys "Completion", "Change settings", and "Start", in addition to a message "16 documents have been read. (Sum of 16 pages)", based on the cutting out of the documents by the document extractor 25 to prompt the user to perform an operation (refer to FIG. 6J).

Figure 6K:
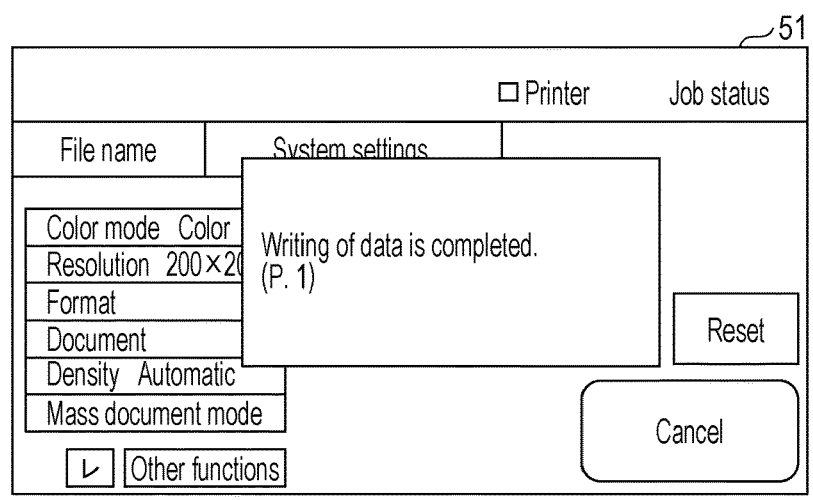
FIG. 6K is an eleventh explanatory diagram illustrating the exemplary operational process of the digital multifunction peripheral illustrated in FIG. 1 in the multi-crop scanning.

Upon touching of the "Completion" key by the user, the control circuit 41 stores the pieces of image data for the 16 documents, which have been read through the batch scanning and cut out, in a USB memory connected to the USB connector 71 (refer to FIG. 6K).

Upon arrangement of 16 documents having numbers 17 to 32, which are to be subjected to the next multi-crop scanning, on the platen 20 (refer to FIG. 6L) and pressing of the "Start" key by the user, the control circuit 41 starts the next batch scanning in response to these operations. Specifically, the control circuit 41 causes the scanning mechanism 21 and the document reading circuit 23 to perform the batch scanning of the 16 documents illustrated in FIG. 6L to read the image data.

The control circuit 41 processes the image data acquired in the first batch scanning and the image data acquired in the second batch scanning as a series of image data.

Upon termination of the second batch scanning, the document extractor 25 cuts out the images corresponding to the 16 documents having numbers 17 to 32. The control circuit 41 causes the operation display circuit 51 to display the operation keys "Completion", "Change settings", and "Start", in addition to a message "16 documents have been read. (Sum of 32 pages)", based on the cutting out of the documents by the document extractor 25 (refer to FIG. 6M).

Upon touching of the "Completion" key by the user (refer to FIG. 6N), the control circuit 41 stores the pieces of image data for the 32 documents, which have been read through the two batch scannings and cut out, in a USB memory connected to the USB connector 71. Upon termination of writing of the pieces of image data into the USB memory, the control circuit 41 causes the operation display circuit 51 to display a message "Writing of data is completed. (P. 2)" (refer to FIG. 6O).

Since the control circuit 41 is capable of acquiring the opening-closing state of the document cover 33 with the cover opening-closing sensor 35, the "Start" key may be disabled while the document cover 33 is opened to disable starting of the batch scanning.

Figure 6L:
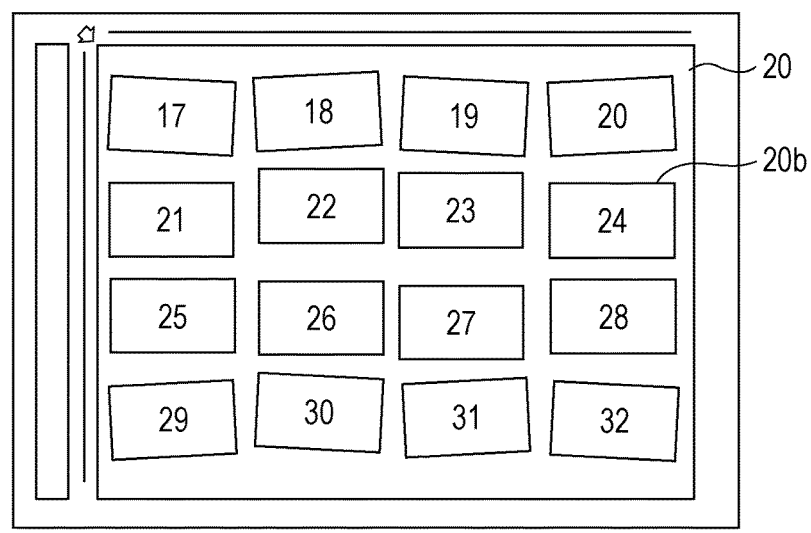
FIG. 6L is a twelfth explanatory diagram illustrating the exemplary operational process of the digital multifunction peripheral illustrated in FIG. 1 in the multi-crop scanning.
Figure 6M:
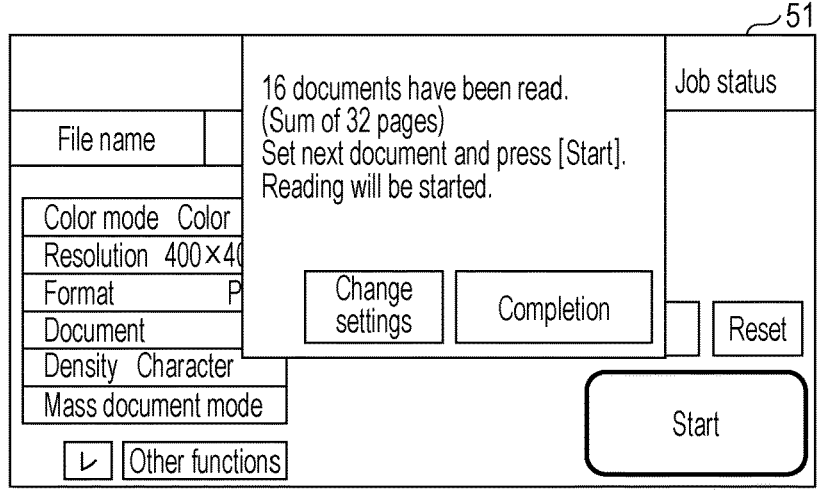
FIG. 6M is a thirteenth explanatory diagram illustrating the exemplary operational process of the digital multifunction peripheral illustrated in FIG. 1 in the multi-crop scanning.
Figure 6N:
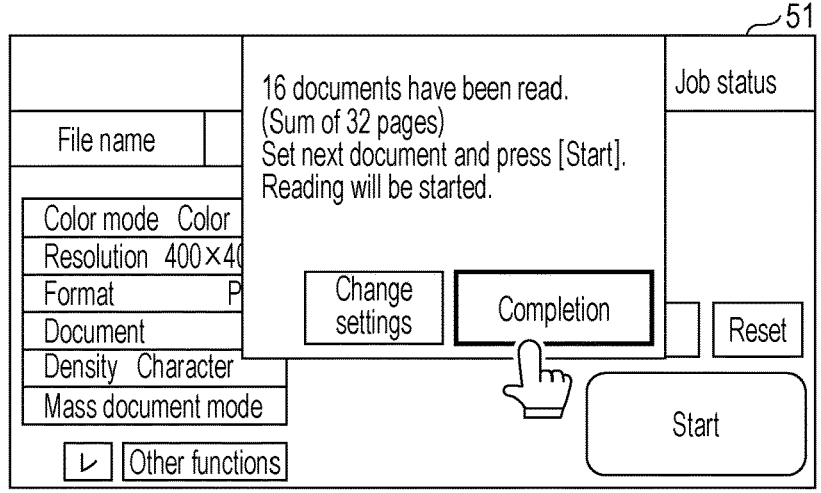
FIG. 6N is a fourteenth explanatory diagram illustrating the exemplary operational process of the digital multifunction peripheral illustrated in FIG. 1 in the multi-crop scanning.
Figure 6O:
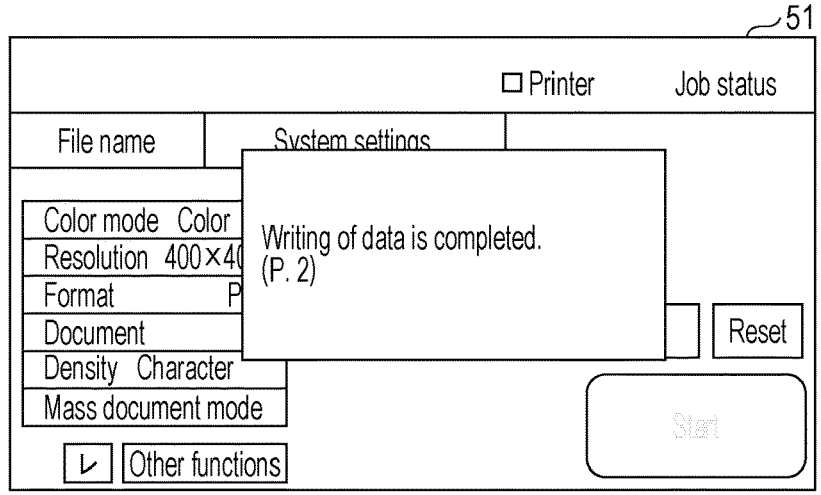
FIG. 6O is a fifteenth explanatory diagram illustrating the exemplary operational process of the digital multifunction peripheral illustrated in FIG. 1 in the multi-crop scanning.

Alternatively, when the "Start" key is pressed with the document cover 33 being opened, starting of the batch scanning may be suppressed to cause the operation display circuit 51 to display a message to prompt the user to close the document cover 33 and press the "Start" key again.
Reading Area for Multi-Crop Scanning The reading area of the document having a fixed size is determined by the control circuit 41 based on the document size detected by the document size detecting circuit 31. However, when the multiple documents 20b are placed on the platen 20 so as to be spaced from each other, as illustrated in FIG. 6G and FIG. 6L, the document size detecting circuit 31 of the first embodiment is not capable of accurately detecting the size of each document.

Accordingly, when the multi-crop scanning is selected by the user who touches the "Multi-crop" key, the control circuit 41 ignores the document size detected by the document size detecting circuit 31 and causes the scanning mechanism 21 and the document reading circuit 23 to read the readable maximum area. In other words, the control circuit 41 determines the readable maximum area as the reading area regardless of the result of the detection by the document size detecting circuit 31.
Process of Cutting Out Document A process of cutting out an image of one or more documents from images that are read will now be described.

The cutting out of a document is realized by the processing in the position detection image generator 24b, the output image generator 24a, the document position detector 24c, and the document extractor 25.

FIG. 7 is an explanatory diagram illustrating an exemplary flow of the process of cutting out an image of one or more documents from images that are read through the batch scanning in the first embodiment. As illustrated in FIG. 7, the documents 20b placed on the platen 20 are collectively read through the batch scanning performed through cooperation of the scanning mechanism 21 and the document reading circuit 23. In the example illustrated in FIG. 7, four documents (a document A to a document D) placed on the platen 20 are collectively read. The document A and the document D have a ground color of white while the document B and the document C have a ground color of a high density.

Two pieces of image data are generated by the reading through the batch scanning.

One piece of image data is an output image 80a. The output image 80a is generated by the output image generator 24a and is stored in the storage circuit 43. As described below, document areas are cut out from the output image 80a for output. In other words, the output image 80a is an image from which the document areas are cut out.

The other piece of image data is a position detection image 80b. The position detection image 80b is generated by the position detection image generator 24b and is temporarily stored in the storage circuit 43. The position detection image generator 24b generates the position detection image that is adjusted so that the boundary between the margin of each of the document A to the document D and the area outside the document is easily and accurately determined.

In the batch scanning, the white color of the bottom face (hereinafter also referred to as a cover color) of the document cover 33 is read in the area outside the document. Accordingly, for example, the position detection image generator 24b adjusts gradation characteristics based on the density of the cover color. For example, when the ground color of the document has a density close to that of the cover color and there is a slight difference between the ground color and the cover color, the position detection image generator 24b adjusts the gradation characteristics so as to enhance the difference in density.

More specifically, for example, white having a reflectance higher than that of the ground color of a general document is selected as the cover color and the position detection image generator 24b generates the position detection image having the gradation characteristics in which white is used as the cover color and gray is used as the ground color of the document, which has a density slightly higher than that of the cover color. Specifically, the position detection image generator 24b generates the position detection image having the gradation characteristics adjusted so that the difference in density is enhanced in a low-density portion close to white and the difference in density is reduced in a high-density portion in accordance with the enhancement of the difference in density in the low-density portion. Accordingly, the difference in density between the ground color of the document A and the document D and the cover color is enhanced and the user is easily determine the outline of the document. There is no problem for the document B and the document C having colored grounds because the outlines of the document B and the document C are clear due to the difference in density between the ground color and the cover color and the ground color is adjusted so as to have a high density even if the ground color of the document B and the document C is affected by the gradation characteristics.

Gray having a density slightly higher than that of the ground color of a general document, that is, having a reflectance lower than that of the ground color of a general document or, for example, a yellowish color may be selected as the cover color. The position detection image generator 24b generates the position detection image having the gradation characteristics in which white is used as the ground color of the document and a dark gray or a dark yellow is used as the cover color having a density slightly higher than that of the ground color of the document. The difference in density between the ground color and the cover color is enhanced for the document A and the document D having the ground color of white. The difference in density between the ground color and the cover color is enhanced also for the document B and the document C having colored grounds unless the ground color has the same density as that of the cover color.

The gradation characteristics in the generation of the position detection image may be determined in advance or may be adaptively adjusted based on the image acquired through the batch scanning. The adaptive adjustment means, for example, adjustment in which steeper gradation characteristics are provided in order to further enhance the difference in density in the low-density portion when high distribution appears in a density portion close to the density of the cover color in a histogram of the output image acquired through the batch scanning.

In addition to or instead of the adjustment of the gradation characteristics, processing using an image filter, such as outline enhancement or outline extraction to enhance the outline of a document, may be performed or other image processing may be performed.

The document position detector 24c determines whether a document exists in the image acquired through the batch scanning and, if a document exists, which area the document exists using the position detection image generated in the above manner.

The document extractor 25 recognizes and cuts out the boundary of each document based on the contrast in density or hue between the margin of the document and the area outside the document.

More accurate determination of the position of the document is enabled if the determination is based on the assumption that the document has a substantially rectangular shape. However, since the document may not have a substantially rectangular shape, the user, a device manager, or a service engineer may determine whether the position of the document is determined based on the assumption that the document has a substantially rectangular shape.

The document extractor 25 cuts out one or more images at the corresponding positions from the output image based on the positions of the documents determined by the document position detector 24c. The images of the respective documents cut out and output from the output image 80a are illustrated as document images 80c in FIG. 7.

Output of Image Data

Upon termination of the batch scanning, the control circuit 41 stores the pieces of image data for the 16 documents, which have been read through the batch scanning and have been cut out by the document extractor 25, in a USB memory connected to the USB connector 71.

Figure 8:
FIG. 8 is an explanatory diagram illustrating a state in which pieces of image data for documents that are read through the multi-crop scanning are stored in a USB memory connected to the digital multifunction peripheral illustrated in FIG. 1.

As illustrated in FIG. 8, the pieces of image data corresponding to the 32 documents that are cut out are stored in the USB memory as 32 files stored in one folder. The folder is newly created in the storage of the files in the USB memory.

The file name given to each of the 32 files includes information about the date and time when the document is subjected to the batch scanning. In addition, the file mane includes information indicating the association between the 32 files. In the case of the first file name "image20150123_0921_0001.pdf", among the files illustrated in FIG. 8, a portion "20150123" indicates the date of Jan. 23, 2015 and a portion "0921" indicates the time of 09:21. Since the 32 files are read through the batch scanning, the 32 files have the information indicating the same date and time. Sequential numbers 0001 to 0032 indicating the association are added to the ends of the file names of the respective files. The user is capable of easily recognizing that the image data is a series of image data because of the sequential numbers added to the file names.

The information indicating the date and time when the document is subjected to the batch scanning is also added to the folder name in which the files are stored.

Figure 9:
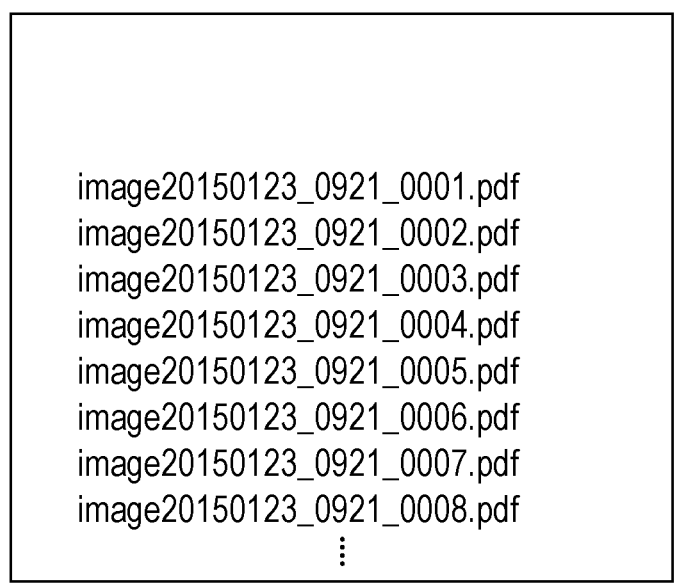
FIG. 9 is an explanatory diagram illustrating another aspect of the state in which pieces of image data for documents that are read through the multi-crop scanning are stored in a USB memory connected to the digital multifunction peripheral illustrated in FIG. 1.

FIG. 9 is an explanatory diagram illustrating an aspect different from that in FIG. 8. The pieces of image data corresponding to the respective documents that are cut out through the batch scanning are stored in a folder that is newly created in FIG. 8 while the files are stored without creating a folder in FIG. 9. However, the file names of the 32 pieces of image data include the information indicating the date and time when the document is subjected to the batch scanning, as in FIG. 8. In addition, the file names of the 32 pieces of image data also include the sequential numbers as the information indicating the association between the 32 files. Even when only the file names are stored, the association between the 32 files are determined because the same date and the same time are added to the file names.

Process of Multi-Crop Scanning

Figure 10:
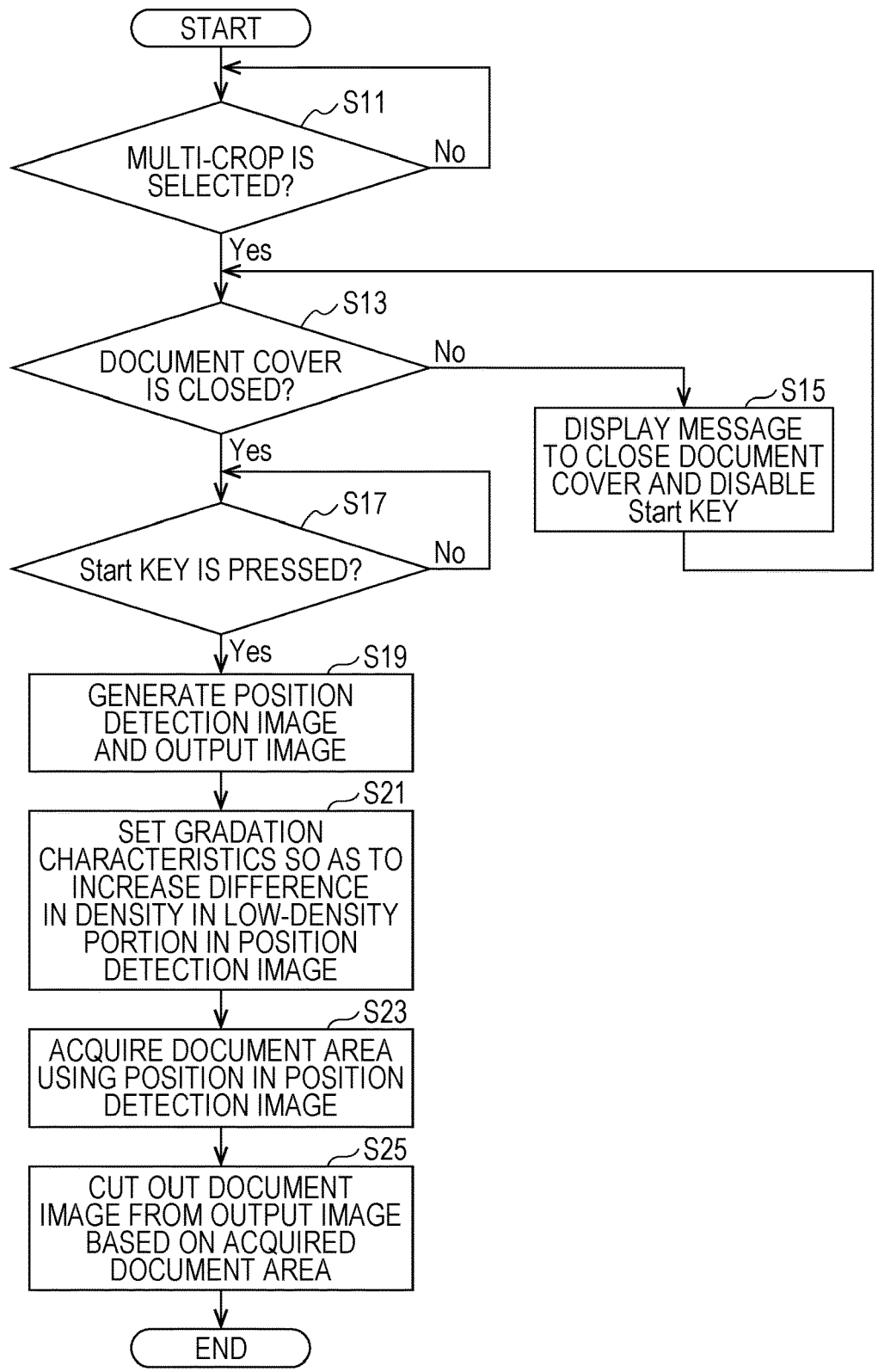
FIG. 10 is a flowchart illustrating an exemplary process of controlling components when a control circuit performs the multi-crop scanning in the first embodiment.

FIG. 10 is a flowchart illustrating an exemplary process of controlling the image generating unit 22, the document position detector 24c, the document extractor 25, the display circuit 51a, and so on when the control circuit 41 performs the multi-crop scanning in the first embodiment. The process will be described according to the flowchart.

Referring to FIG. 10, in Step S11, the control circuit 41 monitors selection of the multi-crop on the operation screen illustrated in FIG. 6C.

If the multi-crop is selected (YES in Step S11), in Step S13, the control circuit 41 refers to the cover opening-closing sensor 35 to determine whether the document cover is closed. If the document cover is not closed (NO in Step S13), in Step S15, the control circuit 41 displays the message (refer to FIG. 6E) to prompt the user to close the document cover and does not accept the "Start" key.

If the document cover is closed (YES in Step S13), in Step S17, the control circuit 41 determines whether the "Start" key is pressed. If the "Start" key is pressed (YES in Step S17), in Step S19, the control circuit 41 causes the output image generator 24a to generate the output image and causes the position detection image generator 24b to generate the position detection image.

In Step S21, the control circuit 41 causes the position detection image generator 24b to generate the position detection image having the gradation characteristics in which the difference in density between the cover color and the ground color of the document is enhanced.

In Step S23, the control circuit 41 causes the document position detector 24c to determine whether a document exists and, if a document exists, the position of the document based on the generated position detection image.

In Step S25, the control circuit 41 causes the document extractor 25 to cut out the document image from the generated output image based on the acquired document area.

Then, the control circuit 41 causes the image output circuit 27 to output the document image that is cut out.

The process when the control circuit 41 performs the multi-crop scanning is performed in the above manner.

Second Embodiment

The output image and the position detection image are separately generated through the batch scanning in the first embodiment. In contrast, in a second embodiment, after the position detection image is generated through the batch scanning and the documents are extracted from the position detection image to cut out the documents, the images of the documents that are cut out are converted for output. The images to be output are equal or substantially equal to the ones output in the first embodiment. Whether the images to be output are completely equal to the ones output in the first embodiment depends on whether the image processing to generate the output image and the image processing to generate the position detection image are reversible to each other or include irreversible processing. The adjustment of the gradation characteristics is the reversible processing.

Figure 11:
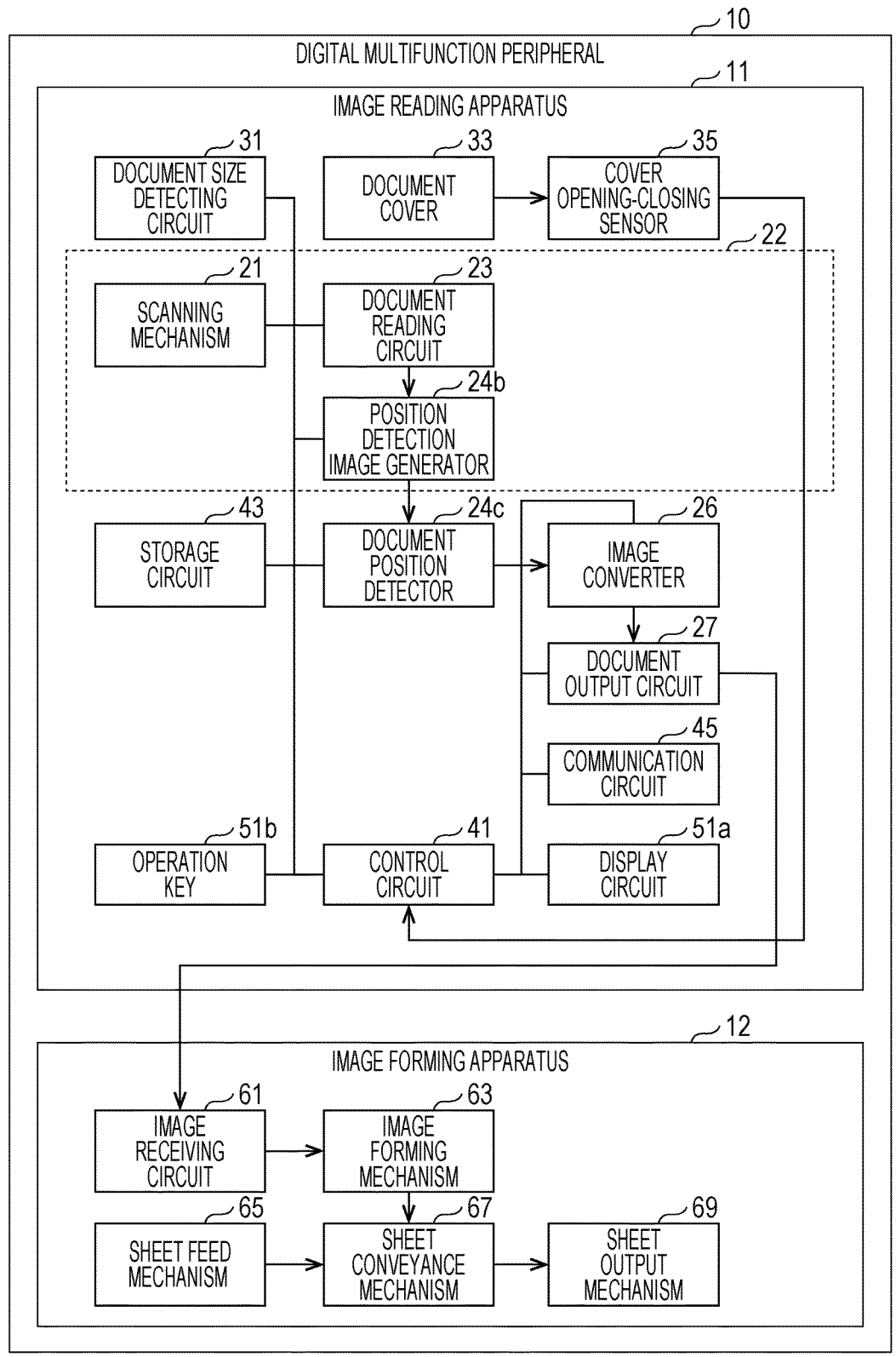
FIG. 11 is a block diagram illustrating an exemplary configuration of a digital multifunction peripheral according to a second embodiment.

FIG. 11 is a block diagram illustrating an exemplary configuration of a digital multifunction peripheral according to the second embodiment, which is different from the one illustrated in FIG. 2. Referring to FIG. 11, the digital multifunction peripheral 10 according to the second embodiment includes an image converter 26, instead of the output image generator 24a and the document extractor 25.

Figure 12:
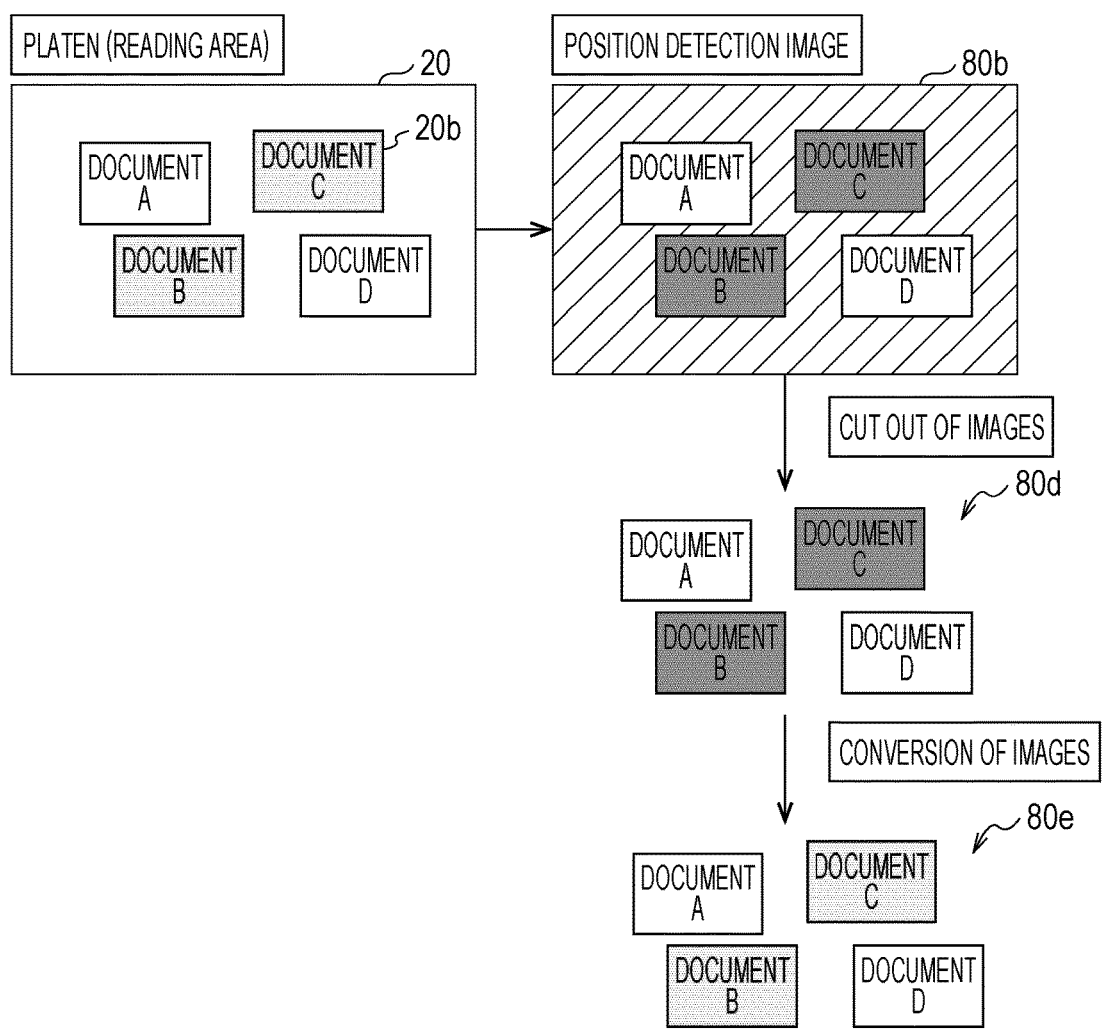
FIG. 12 is an explanatory diagram illustrating an exemplary flow of a process of cutting out an image of one or more documents from images that are read through the batch scanning in an aspect different from that of the first embodiment (the second embodiment)

FIG. 12 is an explanatory diagram illustrating an exemplary flow of the process of cutting out an image of one or more documents from images that are read through the batch scanning in the second embodiment. The flow in FIG. 12 is the same as the one in FIG. 7 in that the documents 20b placed on the platen 20 are collectively read through the batch scanning performed through cooperation of the scanning mechanism 21 and the document reading circuit 23. The document A to the document D placed on the platen 20 correspond to the document A to the document D in FIG. 7.

The process illustrated in FIG. 12 is different from the one illustrated in FIG. 7 in that only the position detection image 80b is generated through the batch scanning and no output image is generated in this stage. The position detection image 80b is generated by the position detection image generator 24b, as in FIG. 7. The document position detector 24c determines whether a document exists in the image acquired through the batch scanning and, if a document exists, which area the document exists using the generated position detection image 80b.

The image converter 26 cuts out one or more images at the corresponding positions from the position detection image 80b based on the positions of the documents determined by the document position detector 24c. The images of the respective documents cut out from the position detection image 80b are illustrated as cut-out images 80d in FIG. 12. The cut-out images 80d correspond to the images of the respective documents.

In addition, the image converter 26 converts the cut-out images 80d corresponding to the respective documents into document images 80e to be output.

More specifically, for example, the position detection image generator 24b generates the position detection image 80b having the gradation characteristics in which the difference in density in the low-density portion is enhanced. Then, the image converter 26 cuts out the areas corresponding to the respective documents from the position detection image 80b and converts the gradation characteristics of the cut-out images 80d, which keep the gradation characteristics of the position detection image 80b when the areas are cut out, into the same gradation characteristics as those of the document images 80c illustrated in FIG. 7.

Figure 13:
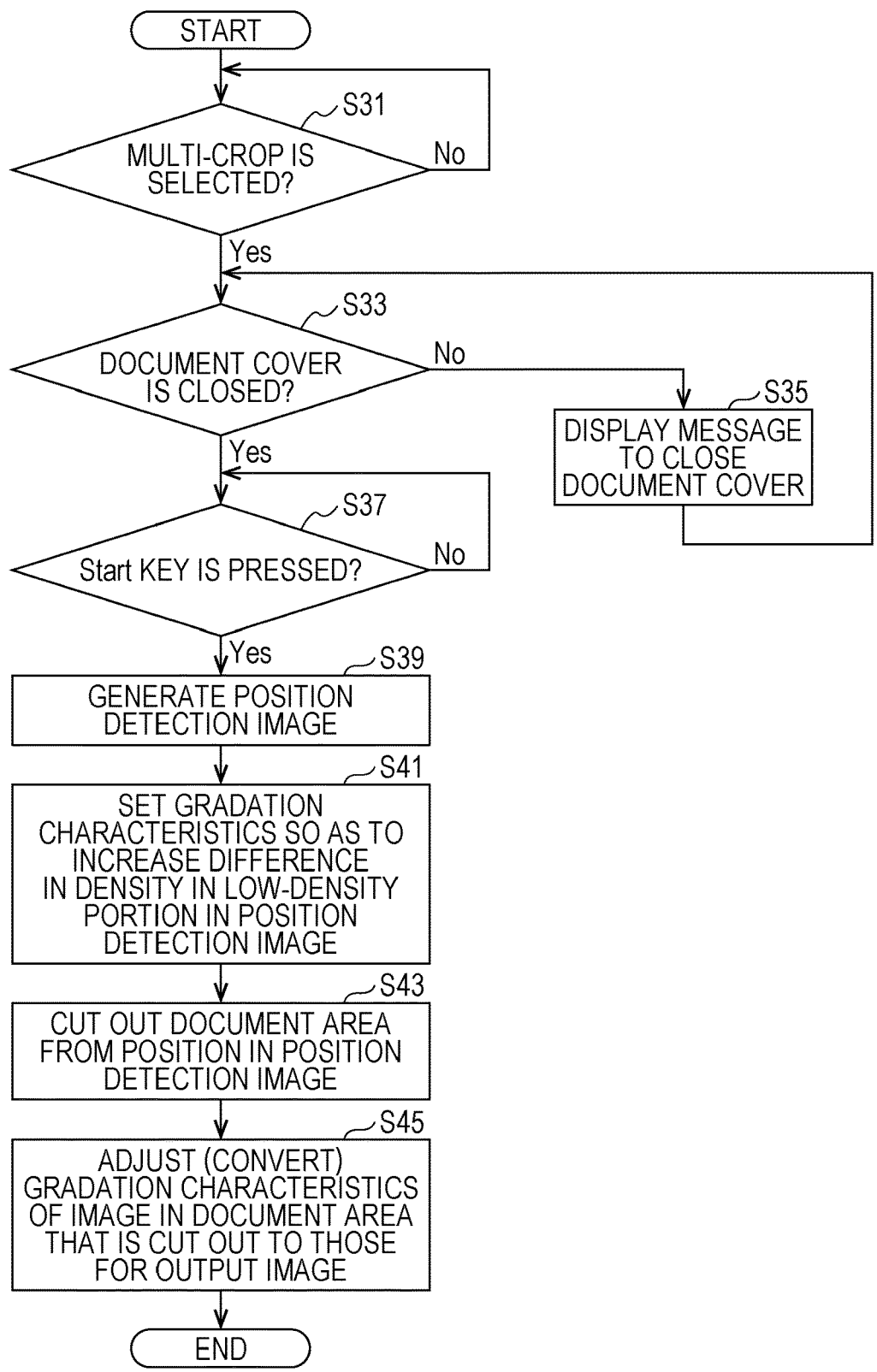
FIG. 13 is a flowchart illustrating an exemplary process of controlling the components when the control circuit performs the multi-crop scanning in the second embodiment.

FIG. 13 is a flowchart illustrating an exemplary process of controlling the image generating unit 22, the document position detector 24c, the image converter 26, the display circuit 51a, and so on when the control circuit 41 performs the multi-crop scanning in the second embodiment. The process will be described, focusing on the points different from FIG. 10 according to the first embodiment.

Steps S31 to S37 in FIG. 13 correspond to Steps S11 to S17 in FIG. 10, respectively, and a description of Steps S31 to S37 is omitted herein.

If the "Start" key is pressed in the state in which the multi-crop is selected and the document cover is closed (YES in Step S37), in Step S39, the control circuit 41 causes the position detection image generator 24b to generate the position detection image.

The position detection image generated in Step S39 is the same as the one generated in Step S19 in FIG. 10. In Step S41, the control circuit 41 causes the position detection image generator 24b to generate the position detection image having the gradation characteristics in which the difference in density between the cover color and the ground color of the document is enhanced.

In Step S43, the control circuit 41 causes the image converter 26 to cut out the document area from the position detection image generated in Step S41. In Step S45, the control circuit 41 causes the image converter 26 to adjust (convert) the gradation characteristics of the image that is cut out to (into) the gradation characteristics for output. The control circuit 41 causes the image output circuit 27 to output the document image, which is cut out from the position detection image and the gradation characteristics of which are adjusted for output.

The process when the control circuit 41 performs the multi-crop scanning is performed in the above manner in the second embodiment.

Third Embodiment

Photo Multi-Crop

The ground colors of general documents, such as business documents or booklets, are often white or often have low densities, as described above. In addition, when the multi-crop scanning is not performed, the bottom face of the document cover is white so that the user feels no feeling of strangeness between the area outside the document and the ground color of the document, as described above.

The position detection image generator 24b in the first and second embodiments generates the position detection image, which is adjusted so that the boundary between the white bottom face of the document cover and the ground color of the document is made more clear, in the multi-crop scanning. The document extractor 25 recognizes the boundary of each document based on the difference in density or hue, that is, the contrast between the ground color of the document and the area outside the document in the position detection image and cuts out the image corresponding to the document.

Specifically, when "Multi-crop" is selected on the operation screen illustrated in FIG. 6D, the position detection image generator 24b generates the position detection image desirable for the document the ground color of which is white or has a low density.

However, the margin may have a dark color depending on the kind of the document, for example, in the case of a photo.

In a third embodiment, the multi-crop function for a document the margin of which has a dark color is referred to as "Photo multi-crop".

Figure 14:
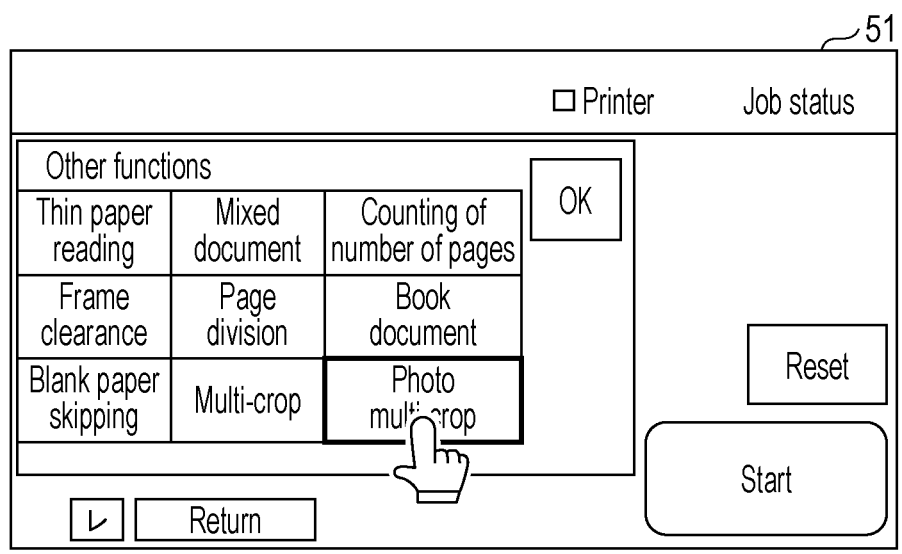
FIG. 14 is an explanatory diagram illustrating an exemplary operation of the digital multifunction peripheral illustrated in FIG. 1 when photo multi-crop is selected (a third embodiment)

FIG. 14 is an explanatory diagram illustrating an exemplary operation for the digital multifunction peripheral 10 when the photo multi-crop is selected. When "Photo multi-crop" is selected on the operation screen illustrated in FIG. 14, the position detection image generator 24b generates the position detection image desirable for the image the margin of which has a high density or a halftone or the image that includes a high density or a halftone in part of the margin.

When "Photo multi-crop" is selected, the position detection image generator 24b generates the position detection image having the gradation characteristics that are adjusted based on the assumption that the document has a dark color in the entire margin or part of the margin.

More specifically, for example, the position detection image generator 24b reduces the difference in density of the document to adjust the gradation characteristics so as to entirely have an intermediate density or a high density. For example, the gradation characteristics are adjusted so that the entire margin is close to an intermediate density to enable the accurate determination of the outline of the document even if part of the margin of the document has a high density and the remaining portion of the margin of the document has a low density.

A typical example of the document the margin of which has a dark color is the document of a photo with no margin showing a night scene.

"Photo multi-crop", which is the multi-crop scanning for a document the margin of which has a dark color is provided, in addition to normal "Multi-crop scanning", to enable the user to select "Photo multi-crop" or "Multi-crop scanning" depending on the document.

When the photo multi-crop function is performed, the "Photo multi-crop" operation key is pressed, instead of the "Multi-crop" operation key, on the operation screen illustrated in FIG. 6D. The subsequent operation screens and the subsequent flow of the operation process are the same as those in the normal multi-crop. As in the normal multi-crop, the batch scanning is performed with the document cover being closed.

If the position detection image generator 24b is capable of generating the position detection image from which the document area is accurately extracted regardless of whether the document has a margin of white or a low density or the document has a margin of a high density or a halftone, "Photo multi-crop" may not be provided separately from "Multi-crop".

Fourth Embodiment

Although the photo multi-crop described above is based on the assumption that the margin of the photo document has a high density or an intermediate density, the photo document may not have such a margin.

Accordingly, in a fourth embodiment, the user selects the batch scanning with the document cover being closed or the batch scanning with the document cover being opened depending on the density of the margin of the photo document. In response to the result of the selection by the user, the position detection image generator 24b adjusts the gradation characteristics to enhance the contrast between the margin of the document and the area outside the document.

Specifically, when the scanning is performed with the document cover being closed, the position detection image generator 24b adjusts the gradation characteristics based on the low density portion to enhance the difference in density between the cover color of white or a color close to white and the document. In contrast, when the scanning is performed with the document cover being opened, the position detection image generator 24b adjusts the gradation characteristics based on the high density portion to enhance the difference in density between the area outside the document of a color close to black and the document.

In the fourth embodiment, the control circuit 41 does not cause the operation display circuit 51 to display the message to prompt the user to operate the document cover, illustrated in FIG. 6E.

Figure 15:
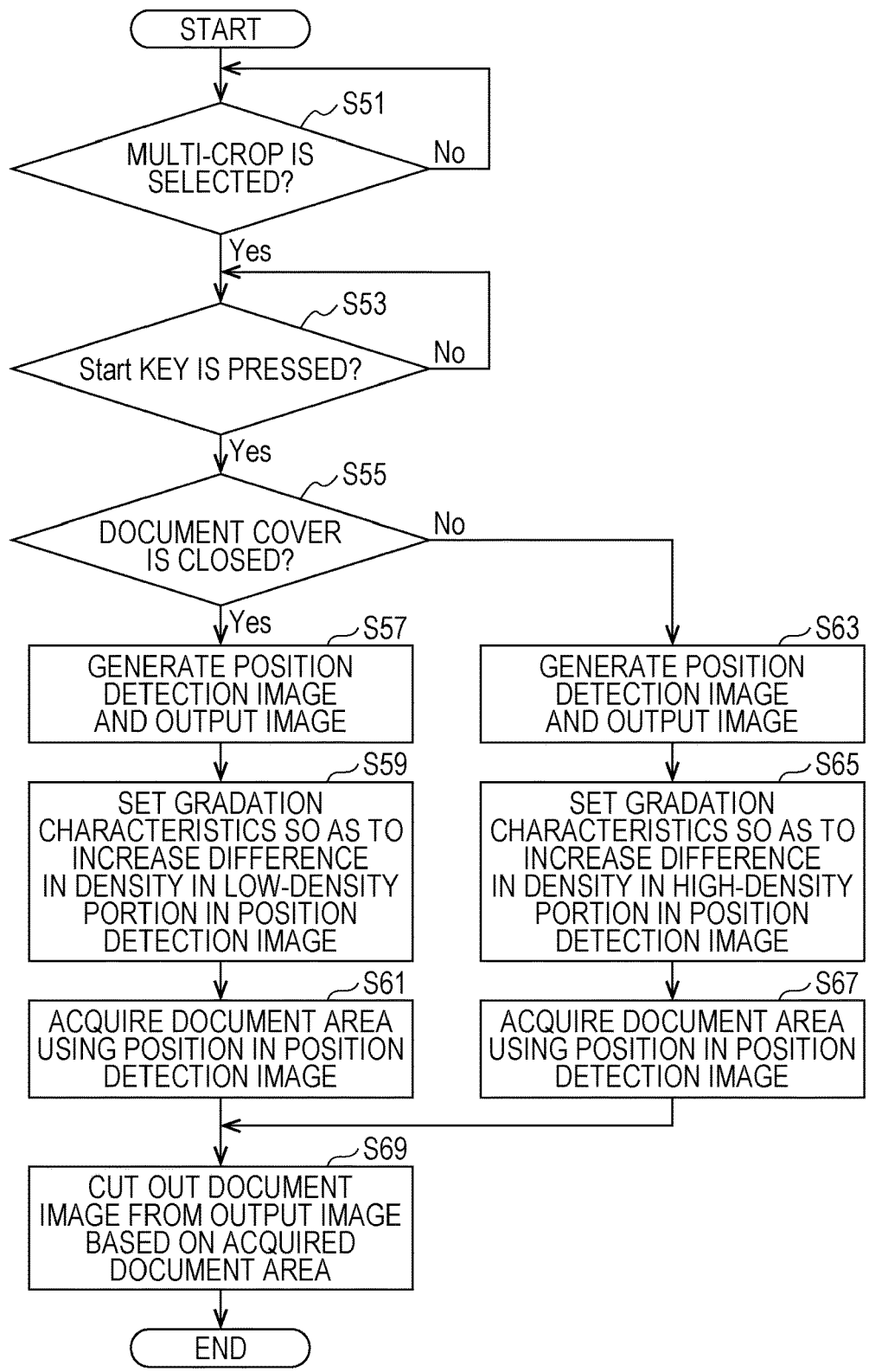
FIG. 15 is a flowchart illustrating an exemplary process of controlling the components when the control circuit performs the photo multi-crop in a fourth embodiment.
Figure 16:
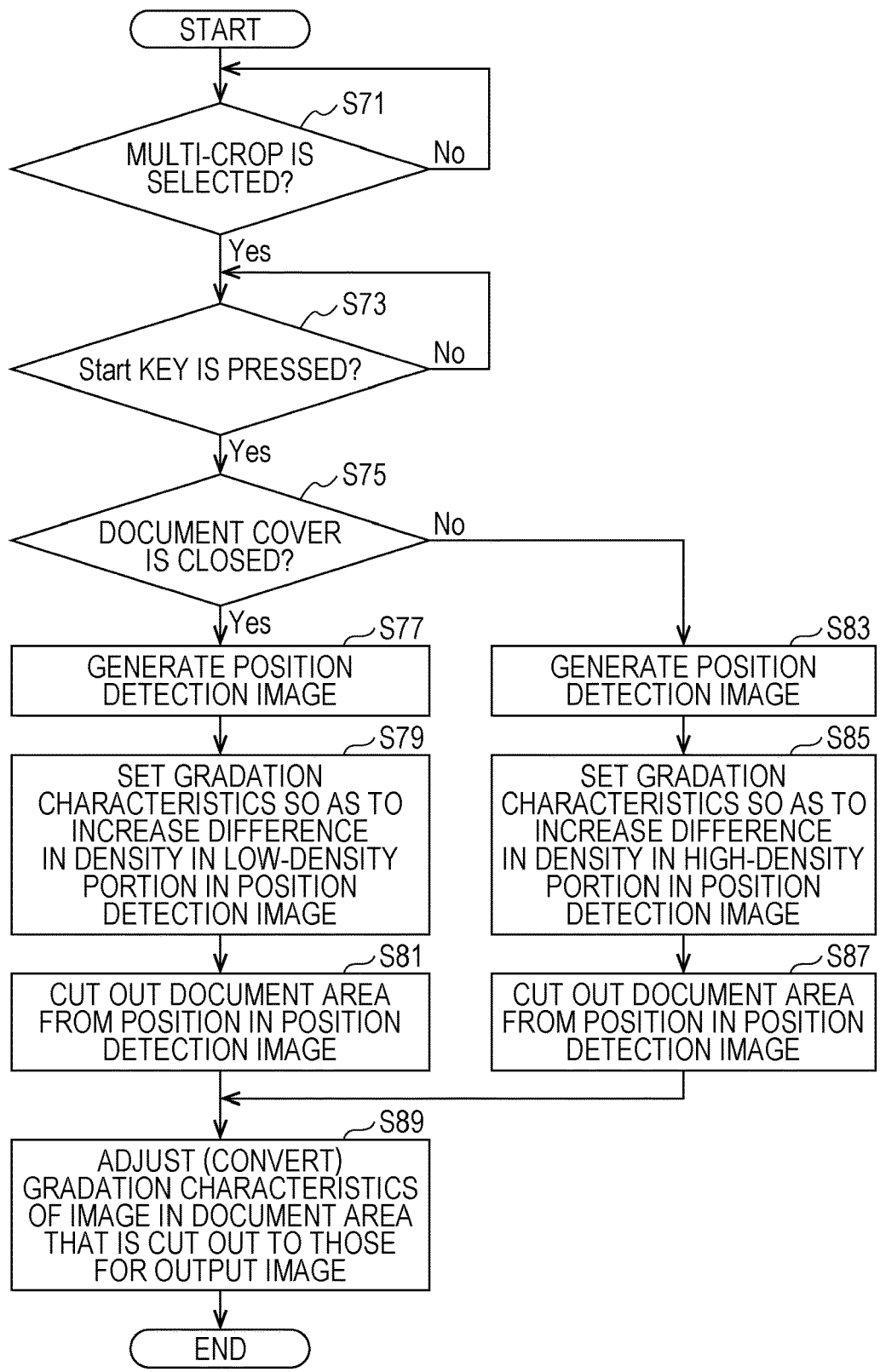
FIG. 16 is a flowchart of a different aspect illustrating the exemplary process of controlling the components when the control circuit performs the photo multi-crop in the fourth embodiment.

FIG. 15 and FIG. 16 correspond to FIG. 10 and FIG. 13, respectively. FIG. 15 and FIG. 16 are flowcharts illustrating an exemplary process of adjusting the gradation characteristics of the position detection image depending on whether the document cover is opened or closed in the scanning.

Referring to FIG. 15, Step S51 corresponds to Step S11 in FIG. 10. Since the message illustrated in FIG. 6E is not displayed, the steps corresponding to Steps S13 and S15 in FIG. 10 do not exist.

If the multi-crop is selected (YES in Step S51) and the "Start" key is pressed (YES in Step S53), in Step S55, the control circuit 41 refers to the cover opening-closing sensor 35 to determine whether the "Start" key is pressed with the document cover being closed or the "Start" key is pressed with the document cover being opened. The steps (Steps S57 to S61 and Step S69) if the "Start" key is pressed with the document cover being closed correspond to Steps S19 to S25 in FIG. 10.

If the "Start" key is pressed with the document cover being opened (NO in Step S55), in Step S63, the control circuit 41 causes the output image generator 24a to generate the output image and causes the position detection image generator 24b to generate the position detection image, as in Step S57. In Step S65, the control circuit 41 causes the position detection image generator 24b to generate the position detection image having the gradation characteristics in which the difference in density between the area outside the document of black and the high density portion of the document is enhanced, unlike Step S59.

In Step S67, the control circuit 41 causes the document position detector 24c to determine whether a document exists and, if a document exists, the position of the document based on the generated position detection image.

In Step S69, the control circuit 41 causes the document extractor 25 to cut out the document image from the generated output image based on the acquired document area.

FIG. 16 corresponds to FIG. 13. However, the message to prompt the user to operate the document cover is not displayed, as in the correspondence between FIG. 10 and FIG. 15.

If the "Start" key is pressed with the document cover being closed (YES in Step S75), in Step S79, the gradation characteristics adjusted based on the low density portion are applied, as in Step S41 in FIG. 13. In contrast, if the "Start" key is pressed with the document cover being opened (NO in Step S75), in Step S85, the control circuit 41 causes the position detection image generator 24b to generate the position detection image having the gradation characteristics in which the difference in density between the area outside the document of black and the high density portion of the document is enhanced.

Fifth Embodiment

The examples are described in the first and second embodiments in which the multiple documents are subjected to the batch scanning to output the images corresponding to the respective documents, as illustrated in FIG. 6G, FIG. 6L, FIG. 7, and FIG. 12.

However, the multi-crop scanning function may be performed in order to extract multiple areas from one document. In a fifth embodiment, a specific example of the above case will be described.

FIG. 17 illustrates an example of the multi-crop scanning in which areas illustrated by "Photo 1" and "Photo 2" in FIG. 17 are extracted from a two-page document 20c of a newspaper or a booklet, which is placed on the platen 20, to output the separate images of the areas.

In the example in FIG. 17, the ground color of the document is white close to the cover color and portions indicated by "a", "b", and "c", in addition to the areas of "Photo 1" and "Photo 2", are the portions having the colored grounds. Characters are printed on a sheet having a ground color of white in the remaining area.

Only the photos are capable of being cut out from the document illustrated in FIG. 17 using the photo multi-crop function.

Here, the document position detector 24c does not detect an area having continuous intermediate densities, that is, an area in which pixels of halftones are adjacently arranged as the document if the area is smaller than a predetermined area. The predetermined area may be determined based on the sizes of photos or name cards.

In the case of the photo multi-crop, the document position detector 24c may discriminate between the photo area and the other areas by temporarily generating image data having a resolution lower than that of the position detection image 80b and generating the area of the characters (articles) as a connected area in units of lines.

In addition, the document position detector 24c does not detect the area having continuous intermediate densities as the document if the aspect ratio of the area is not within a predetermined ratio. The predetermined ratio may be determined based on the aspect ratios of the sizes of photos or name cards.

Since the areas of the characters and the areas "a" and "c" are smaller than the predetermined area in FIG. 17, the area of the characters and the areas "a" and "c" are not extracted as the documents. The aspect ratio of the areas "a" and "c" is within the predetermined ratio.

Since the aspect ratios of the characters of each line and the area "b" are not within the predetermined ratio, the characters of each line and the area "b" are not extracted as the documents. The size of the area "b" is greater than the predetermined area.

The areas of "Photo 1" and "Photo 2" having continuous intermediate densities are extracted from the document 20c as the document images 80c in the above manner.

As described above, (1) an image reading apparatus according to an embodiment includes a platen on which a document is to be placed, an image generating unit that performs scanning on the platen to generate a position detection image and an output image, a document position detecting unit that detects whether a document exists and a position of the document based on the generated position detection image, a document extracting unit that extracts an area corresponding to the document from the generated output image, and a control unit that controls the image generating unit, the document position detecting unit, and the document extracting unit so as to output an image of the extracted document.

In the present disclosure, the platen is a space where a document is to be placed in reading of an image of the document and a document reading circuit reads the image of the document placed on the platen. In a specific aspect, for example, the platen is an area in which a plate made of transparent glass or transparent resin is horizontally placed and a document is to be placed on the plate so that the face of the document, which is to be read, is directed downward. The document reading circuit performs the scanning while reading the document upward from below the plate to read the image. However, the present disclosure is not limited to the above aspect. For example, an aspect is also included in the present disclosure in which a document is placed on the opaque or transparent platen so that the face of the document, which is to be read, is directed upward and the document is scanned from above the platen.

Although the document is generally a flat sheet, the document is not limited to this. A rough document or a three-dimensional document may be used.

Scanning on the platen means that the batch scanning is performed in the state in which documents are placed on the platen even if the multiple documents are placed to extract the images of the documents from the position detection image and the output image acquired through the batch scanning. A process of sequentially reading the documents on the platen one by one using the automatic document feeder or the like is not included in the batch scanning.

Cutting out an image of a document means that an image area corresponding to one or more documents is extracted from the entire reading area to be subjected to the batch scanning to perform trimming. When multiple documents are placed on the platen, the image area of each document is extracted. For example, when one document, such as a two-page document of a newspaper or a magazine, in which articles (characters) and photos (images) are mixed is placed on the platen, the area of one or more photos (images), which is included in the document, is extracted from the entire reading area. This is an example of the multi-crop function of the present disclosure.

In the present disclosure, the position detection image is an image that is generated and used for the process of determining the boundary between a document and the area outside the document. In a specific aspect, for example, the position detection image is image data in which the gradation characteristics (so-called y characteristics) are adjusted so as to enhance the difference in density from the document image in the density portion corresponding to the area outside the document. In addition to or instead of the density, the hue may be adjusted or image processing may be performed so as to enhance edges.

In contrast, the output image is output as an image of a document. In other words, the output image is a normal image which the user sees as the result of reading of the document. In a specific aspect, the output image is image data in which the area of the document is trimmed, that is, is subjected to the multi-crop.

The scanning mechanism, the document reading circuit, the position detection image generator, and the output image generator of this embodiment correspond to the image generating unit of the present disclosure.

The document position detecting unit detects whether a document placed on the platen exists using the position detection image and, if a document exists, detects the position of the document. In a specific aspect, the document position detecting unit is the image processing circuit that detects a document. Alternatively, the document position detecting unit may be a central processing unit (CPU) common to the control unit described below or another CPU that processes the image data stored in the memory.

The document extracting unit cuts out the area corresponding to the position of the document on the platen, which is acquired by the document position detecting unit, from the output image. In a specific aspect, for example, the document extracting unit is the image processing circuit that cuts out a specified area in the image data stored in the memory. Alternatively, the document extracting unit may be a CPU common to the control unit described below or another CPU that processes the image data stored in the memory.

The control unit is composed of hardware resources including, for example, the CPU, a memory, and an input-output interface circuit. The function of the control unit is realized by the CPU that executes a processing program stored in the memory. The control circuit in the above embodiment corresponds to the control unit.

Aspects of the image reading apparatus in (1) will be described.

The image reading apparatus may further include an openable-and-closable document holding mechanism that presses the document placed on the platen toward the platen and an opening-closing detecting circuit that detects opening and closing of the document holding mechanism. The document position detecting unit may set an area having a density higher than or equal to a predetermined density or an area having a density lower than or equal to a predetermined density as a non-document area in the output image depending on whether the document holding mechanism is in an open state or in a closed state, which is based on the result of the detection by the opening-closing detecting circuit, to detect whether a document exists and the position of the document.

Whether the area outside the document is read in black or white is determined depending on whether the document holding mechanism performs the scanning on the platen in the open state or in the closed state. With the above configuration, it is possible to accurately determine the color of the area outside the document based on the result of the detection by the opening-closing detecting circuit, thereby accurately extracting the document.

The document cover in the above embodiment corresponds to the document holding mechanism. The cover opening-closing sensor in the above embodiment corresponds to the opening-closing detecting circuit. It is assumed that the bottom face of the document cover is white, as described above.

The above aspect is applicable to an image reading method corresponding to the image reading apparatus.

(2) An image reading apparatus according to another embodiment includes a platen on which a document is to be placed, an image generating unit that performs scanning on the platen to generate a position detection image, a document position detecting unit that detects whether a document exists and a position of the document based on the generated position detection image, an image converting unit that extracts an area corresponding to the position from the generated position detection image to convert the area into an image to be output, and a control unit that controls the image generating unit, the document position detecting unit, and the image converting unit so as to output the converted image.

In the image reading apparatus in (1), after the document position detecting unit is used to detect whether a document exists and the position of the document, the position detection image is not used. In contrast, in the image reading apparatus in (2), the position detection image used to detect whether a document exists and the position of the document is converted to acquire an image to be output.

In this embodiment, for example, after the position of the document is acquired using the position detection image the y characteristics of which are adjusted so as to enhance the difference in density between the document and the area outside the document, the position detection image is re-adjusted to have desired y characteristics for output. In other word, the position detection image is converted into an image to be output and the converted image is output. The extraction, that is, the cutting out of the document area in accordance with the position acquired from the position detection image may be performed before the position detection image is converted into an image to be output or after the position detection image is converted into an image to be output.

Aspects of the image reading apparatus in (2) will be described.

The image reading apparatus may further include an openable-and-closable document holding mechanism that presses the document placed on the platen toward the platen and an opening-closing detecting circuit that detects opening and closing of the document holding mechanism. The document position detecting unit may set an area having a density higher than or equal to a predetermined density or an area having a density lower than or equal to a predetermined density as a non-document area in the output image depending on whether the document holding mechanism is in an open state or in a closed state, which is based on the result of the detection by the opening-closing detecting circuit, to detect whether a document exists and the position of the document.

With the above configuration, it is possible to accurately determine the color of the area outside the document based on the result of the detection by the opening-closing detecting circuit, thereby accurately extracting the document.

The above aspect is applicable to an image reading method corresponding to the image reading apparatus.

In an aspect of the present disclosure, some of the above multiple aspects may be combined.

Various modifications may be made, in addition to the above embodiments. It is not considered that the modifications are not within the scope of the present disclosure. All modifications equivalent to the claims and within the scope of the present disclosure are included the present disclosure.

The present disclosure contains subject matter related to that disclosed in Japanese Priority Patent Application JP 2017-026024 filed in the Japan Patent Office on Feb. 15, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image reading apparatus comprising:
   a platen on which a document is to be placed;
   an image generator including a position detection image generator that performs scanning on the platen and the document, and generates a position detection image and an output image;
   a document position detector that detects whether a document exists and a position of the document based on the generated position detection image;
   wherein the position detection image generator adjusts gradation characteristics of the scanned document and an area outside the document in the position detection image to increase a density difference between the scanned document and the area outside the document;
   a document extractor that extracts an area corresponding to the document from the generated output image; and
   a controller that controls the image generator, the document position detector, and the document extractor so as to output an image of the extracted document.

2. The image reading apparatus according to claim 1, further comprising:
   an openable-and-closable document holding mechanism that presses the document placed on the platen toward the platen, wherein the openable-and-closable document holding mechanism covers the area outside the document; and
   an opening-closing detecting circuit that detects opening and closing of the document holding mechanism,
   wherein the document position detector sets an area having a density higher than or equal to a predetermined density or an area having a density lower than or equal to a predetermined density as a non-document area in the output image depending on whether the document holding mechanism is in an open state or in a closed state, which is based on a result of the detection by the opening-closing detecting circuit, to detect whether a document exists and a position of the document.

3. An image reading method causing a computer to perform:
   generating a position detection image and an output image by performing scanning on a platen on which a document is placed;
   detecting whether a document exists and a position of the document based on the generated position detection image;
   adjusting gradation characteristics of the scanned document and an area outside the document in the position detection image to increase a density difference between the scanned document and the area outside the document; and
   extracting an area corresponding to the document from the generated output image; and
   outputting an image of the extracted document.

4. An image reading apparatus comprising;
   a platen on which a document is to be placed;
   an image generator including a position detection image generator that performs scanning on the platen and the document, and generates a position detection image;
   a document position detector that detects whether a document exists and a position of the document based on the generated position detection image;
   wherein the position detection image generator adjusts gradation characteristics of the scanned document and an area outside the document in the position detection image to increase a density difference between the scanned document and the area outside the document;
   an image convertor that extracts an area corresponding to the position of the document from the generated position detection image to convert the area corresponding to the position of the document into an image to be output, wherein conversion of the area corresponding to the position of the document removes the gradation characteristic adjustments; and
   a controller that controls the image generator, the document position detector, and the image convertor so as to output the converted image.

5. The image reading apparatus according to claim 4, further comprising:
   an openable-and-closable document holding mechanism that presses the document placed on the platen toward the platen, wherein the openable-and-closable document holding mechanism covers the area outside the document; and
   an opening-closing detecting circuit that detects opening and closing of the document holding mechanism, wherein the document position detector sets an area having a density higher than or equal to a predetermined density or an area having a density lower than or equal to a predetermined density as a non-document area in the output image depending on whether the document holding mechanism is in an open state or in a closed state, which is based on a result of the detection by the opening-closing detecting circuit, to detect whether a document exists and a position of the document.

6. An image reading method causing a computer to perform:

generating a position detection image by performing scanning on a platen on which a document is placed;

detecting whether a document exists and a position of the document based on the generated position detection image;

adjusting gradation characteristics of the scanned document and an area outside the document in the position detection image to increase a density difference between the scanned document and the area outside the document increases;

extracting an area corresponding to the position of the document from the generated position detection image to convert the area corresponding to the position of the document into an image to be output; and outputting the converted image.

* * * * *